US011032639B2

(12) United States Patent
Tsingos

(10) Patent No.: US 11,032,639 B2
(45) Date of Patent: *Jun. 8, 2021

(54) DETERMINING AZIMUTH AND ELEVATION ANGLES FROM STEREO RECORDINGS

(71) Applicant: Dolby Laboratories Licensing Corporation, San Francisco, CA (US)

(72) Inventor: Nicolas R. Tsingos, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/509,973

(22) Filed: Jul. 12, 2019

(65) Prior Publication Data

US 2019/0335272 A1    Oct. 31, 2019

Related U.S. Application Data

(63) Continuation of application No. 15/736,713, filed as application No. PCT/US2016/040836 on Jul. 1, 2016, now Pat. No. 10,375,472.

(Continued)

(30) Foreign Application Priority Data

Aug. 14, 2015 (EP) ..................... 15181088

(51) Int. Cl.
*H04R 1/40* (2006.01)
*G10L 19/20* (2013.01)
(Continued)

(52) U.S. Cl.
CPC ............... *H04R 1/406* (2013.01); *G01S 5/02* (2013.01); *G10L 19/008* (2013.01); *G10L 19/20* (2013.01); *H04R 3/005* (2013.01); *H04S 2400/15* (2013.01)

(58) Field of Classification Search
None
See application file for complete search history.

(56) References Cited

U.S. PATENT DOCUMENTS 8,023,660 B2    9/2011    Faller
8,027,478 B2    9/2011    Barry
(Continued)

FOREIGN PATENT DOCUMENTS

EP    1416769    5/2004
EP    2249334    11/2010
(Continued)

OTHER PUBLICATIONS

Ahonen, Jukka "Microphone Configurations for Teleconference Application of Directional Audio Coding and Subjective Evaluation" Audio Engineering Society: 40th International Conference Spatial Audio Sense the Sound of Space, Oct. 2010.

(Continued)

*Primary Examiner* — James K Mooney

(57) ABSTRACT

Input audio data, including first microphone audio signals and second microphone audio signals output by a pair of coincident, vertically-stacked directional microphones, may be received. An azimuthal angle corresponding to a sound source location may be determined, based at least in part on an intensity difference between the first microphone audio signals and the second microphone audio signals. An elevation angle corresponding to a sound source location may be determined, based at least in part on a temporal difference between the first microphone audio signals and the second microphone audio signals. Output audio data, including at least one audio object corresponding to a sound source, may be generated. The audio object may include audio object signals and associated audio object metadata. The audio (Continued)

object metadata may include at least audio object location data corresponding to the sound source location.

20 Claims, 15 Drawing Sheets

Related U.S. Application Data

(60) Provisional application No. 62/188,310, filed on Jul. 2, 2015.

(51) Int. Cl.
*G10L 19/008* (2013.01)
*G01S 5/02* (2010.01)
*H04R 3/00* (2006.01)

(56) References Cited

U.S. PATENT DOCUMENTS

| 8,107,321 | B2 | 1/2012 | Kepesi |
| 2006/0222187 | A1 | 10/2006 | Jarrett |
| 2014/0023196 | A1 | 1/2014 | Xiang |
| 2014/0365231 | A1 | 12/2014 | Hoerich |
| 2015/0016642 | A1 | 1/2015 | Walsh |

FOREIGN PATENT DOCUMENTS

| EP | 2600343 | 6/2013 |
| GB | 2370176 | 6/2002 |
| WO | 2009046460 | 4/2009 |
| WO | 2012072804 | 6/2012 |
| WO | 2013186593 | 12/2013 |
| WO | 2014033222 | 3/2014 |
| WO | 2014076430 | 5/2014 |
| WO | 2014090277 | 6/2014 |
| WO | 2014102129 | 7/2014 |
| WO | 2014162171 | 10/2014 |
| WO | 2015017037 | 2/2015 |

OTHER PUBLICATIONS

Ahonen, Jukka "Microphone Front-Ends for Spatial Sound Analysis and Synthesis with Directional Audio Coding" Department of Signal Processing and Acoustics, Aalto University publication, Doctoral Dissertations, 2013.

Faller, Christof "Microphone Front-Ends for Spatial Audio Coders" AES Convention, presented at the 125th Convention, Oct. 2-5, 2008, San Francisco CA USA, pp. 1-10.

Gerzon, Michael A. "Periphony: With-Heigh Sound Reproduction" J. Audio Engineering Society, vol. 21, No. 1, pp. 2-10, 1973.

Lee, Hyunkook "The Relationship Between Interchannel Time and Level Differences in Vertical Sound Localisation and Masking" AES paper 8556, Oct. 20-23, 2011 (13 pgs.).

Pulkki, Ville "Compensating Displacement of Amplitude-Panned Virtual Sources" AES International Conference on Virtual, Synthetic and Entertainment Audio, Jun. 1, 2002, p. 4.

DETERMINING AZIMUTH AND ELEVATION ANGLES FROM STEREO RECORDINGS

CROSS-REFERENCE TO RELATED APPLICATIONS

This application is a continuation application from U.S. patent application Ser. No. 15/736,713 filed Dec. 14, 2017 which is a U.S. national phase from PCT/US2016/040836 filed 1 Jul. 2016 claiming priority from U.S. Patent Application No. 62/188,310 filed Jul. 2, 2015 and European Patent Application No. 15181088.4 filed 14 Aug. 2015, which are hereby incorporated by reference in their entirety.

TECHNICAL FIELD

This disclosure relates to processing audio data. In particular, this disclosure relates to processing audio data output by a pair of coincident, vertically-stacked directional microphones.

BACKGROUND

Since the introduction of sound with film in 1927, there has been a steady evolution of technology used to capture the artistic intent of the motion picture sound track and to reproduce this content. In the 1970s Dolby introduced a cost-effective means of encoding and distributing mixes with 3 screen channels and a mono surround channel. Dolby brought digital sound to the cinema during the 1990s with a 5.1 channel format that provides discrete left, center and right screen channels, left and right surround arrays and a subwoofer channel for low-frequency effects. Dolby Surround 7.1, introduced in 2010, increased the number of surround channels by splitting the existing left and right surround channels into four "zones."

Both cinema and home theater audio playback systems are becoming increasingly versatile and complex. Home theater audio playback systems are including increasing numbers of speakers. As the number of channels increases and the loudspeaker layout transitions from a planar two-dimensional (2D) array to a three-dimensional (3D) array including elevation, reproducing sounds in a playback environment is becoming an increasingly complex process.

In recent years, Dolby has introduced various methods, devices and software pertaining to audio objects. As used herein, the term "audio object" refers to audio signals (also referred to herein as "audio object signals") and associated metadata that may be created or "authored" without reference to any particular playback environment. The associated metadata may include audio object position data, audio object gain data, audio object size data, audio object trajectory data, etc. As used herein, the term "rendering" refers to a process of transforming audio objects into speaker feed signals for a particular playback environment. A rendering process may be performed, at least in part, according to the associated metadata and according to playback environment data. The playback environment data may include an indication of a number of speakers in a playback environment and an indication of the location of each speaker within the playback environment.

SUMMARY

Some methods disclosed herein involve processing audio data that may include first microphone audio signals and second microphone audio signals output by a pair of coincident, vertically-stacked directional microphones. In some examples, the pair of coincident, vertically-stacked directional microphones may be an XY stereo microphone system. Some such methods may involve receiving input audio data including first microphone audio signals and second microphone audio signals output by a pair of coincident, vertically-stacked directional microphones and determining, based at least in part on an intensity difference between the first microphone audio signals and the second microphone audio signals, an azimuthal angle corresponding to a sound source location.

Some implementations may involve determining, based at least in part on a temporal difference between the first microphone audio signals and the second microphone audio signals, an elevation angle corresponding to the sound source location. In some examples, the elevation angle corresponding to the sound source location may be determined based upon a vertical distance between a first microphone and a second microphone of the pair of coincident, vertically-stacked directional microphones.

Some such methods may involve generating output audio data including at least one audio object corresponding to a sound source. The audio object may include audio object signals and associated audio object metadata. The audio object metadata may include at least audio object location data corresponding to the sound source location. In some examples, the audio object location data may be based, at least in part, on the azimuthal angle and the elevation angle.

Some examples may involve upsampling the input audio data. According to some implementations, the upsampling may be performed prior to determining the elevation angle.

Some methods may involve splitting the input audio data into sub-bands. According to some such methods, the generating process may involve generating a plurality of audio objects, each audio object of the plurality of audio objects corresponding to a sub-band.

Some examples may involve an audio object clustering process. For example, the generating may involve generating N audio objects. Some examples involve performing an audio object clustering process on the N audio objects that outputs fewer than N audio objects.

Some methods may involve a coordinate transformation process. For example, the azimuthal angle and the elevation angle may be determined relative to a first coordinate system. Some such methods may involve transforming the audio object location data into coordinates of a second coordinate system. Some such methods may involve receiving inertial sensor data. Transforming the audio object location data into the second coordinate system may be based, at least in part, on the inertial sensor data.

Some implementations may involve determining an object size parameter of the sound source. Determining the object size parameter of the sound source may involve determining a variance of azimuthal angles corresponding to the sound source, determining a variance of elevation angles corresponding to the sound source, or determining variances of both azimuthal angles and elevation angles corresponding to the sound source. Some methods may involve splitting the input audio data into sub-bands and determining an object size parameter for each of the sub-bands. Some methods may involve determining a diffuse residual that corresponds to uncorrelated components of the first microphone audio signals and the second microphone audio signals and representing the diffuse residual as a pair of additional audio objects having a large size and large decorrelation parameters.

Some methods may involve determining a cross-correlation function between the first microphone audio signals and the second microphone audio signals. Some such methods may involve upsampling the cross-correlation function.

The methods disclosed herein may be implemented via hardware, firmware, software stored in one or more non-transitory media, and/or combinations thereof. For example, at least some aspects of this disclosure may be implemented in an apparatus that includes an interface system and a control system. The interface system may include a user interface and/or a network interface. In some implementations, the apparatus may include a memory system. The interface system may include at least one interface between the control system and the memory system.

The control system may include at least one processor, such as a general purpose single- or multi-chip processor, a digital signal processor (DSP), an application specific integrated circuit (ASIC), a field programmable gate array (FPGA) or other programmable logic device, discrete gate or transistor logic, discrete hardware components, and/or combinations thereof.

According to some examples, the control system may be capable of receiving, via the interface system, input audio data including first microphone audio signals and second microphone audio signals output by a pair of coincident, vertically-stacked directional microphones. In some examples, the control system may be capable of determining, based at least in part on an intensity difference between the first microphone audio signals and the second microphone audio signals, an azimuthal angle corresponding to a sound source location. The control system may be capable of determining, based at least in part on a temporal difference between the first microphone audio signals and the second microphone audio signals, an elevation angle corresponding to the sound source location.

In some implementations, the control system may be capable of generating output audio data including at least one audio object corresponding to a sound source. The audio object may include audio object signals and associated audio object metadata. The audio object metadata may include at least audio object location data corresponding to the sound source location. In some examples, the control system may be capable of determining an object size parameter of the sound source. The audio object metadata may include object size information.

According to some examples, the control system may be capable of splitting the input audio data into sub-bands. The generating may involve generating a plurality of audio objects, each audio object of the plurality of audio objects corresponding to a sub-band.

In some implementations, the azimuthal angle and the elevation angle may be determined relative to a first coordinate system. According to some such implementations, the control system may be capable of receiving, via the interface system, inertial sensor data, and of transforming the audio object location data into coordinates of a second coordinate system based, at least in part, on the inertial sensor data.

Some implementations may involve a non-transitory medium having software stored thereon. The software may include instructions for controlling at least one apparatus for receiving input audio data including first microphone audio signals and second microphone audio signals output by a pair of coincident, vertically-stacked directional microphones and for determining, based at least in part on an intensity difference between the first microphone audio signals and the second microphone audio signals, an azimuthal angle corresponding to a sound source location.

In some examples, the software may include instructions for determining, based at least in part on a temporal difference between the first microphone audio signals and the second microphone audio signals, an elevation angle corresponding to the sound source location. The software may include instructions for generating output audio data including at least one audio object corresponding to a sound source. The audio object may include audio object signals and associated audio object metadata. The audio object metadata may include at least audio object location data corresponding to the sound source location.

According to some implementations, the software may include instructions for splitting the input audio data into sub-bands. The generating process may involve generating a plurality of audio objects, each audio object of the plurality of audio objects corresponding to a sub-band.

In some examples, the azimuthal angle and the elevation angle may be determined relative to a first coordinate system. According to some such examples, the software may include instructions for receiving inertial sensor data and for transforming the audio object location data into coordinates of a second coordinate system based, at least in part, on the inertial sensor data.

According to some examples, the software may include instructions for determining an object size parameter of the sound source. The audio object metadata may include object size information.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DESCRIPTION OF EXAMPLE EMBODIMENTS

The following description is directed to certain implementations for the purposes of describing some innovative aspects of this disclosure, as well as examples of contexts in which these innovative aspects may be implemented. However, the teachings herein can be applied in various different ways. For example, while various implementations are described in terms of particular playback environments, the teachings herein are widely applicable to other known playback environments, as well as playback environments that may be introduced in the future. Moreover, the described implementations may be implemented, at least in part, in various devices and systems as hardware, software, firmware, cloud-based systems, etc. Accordingly, the teachings of this disclosure are not intended to be limited to the implementations shown in the figures and/or described herein, but instead have wide applicability.

Figure 1:
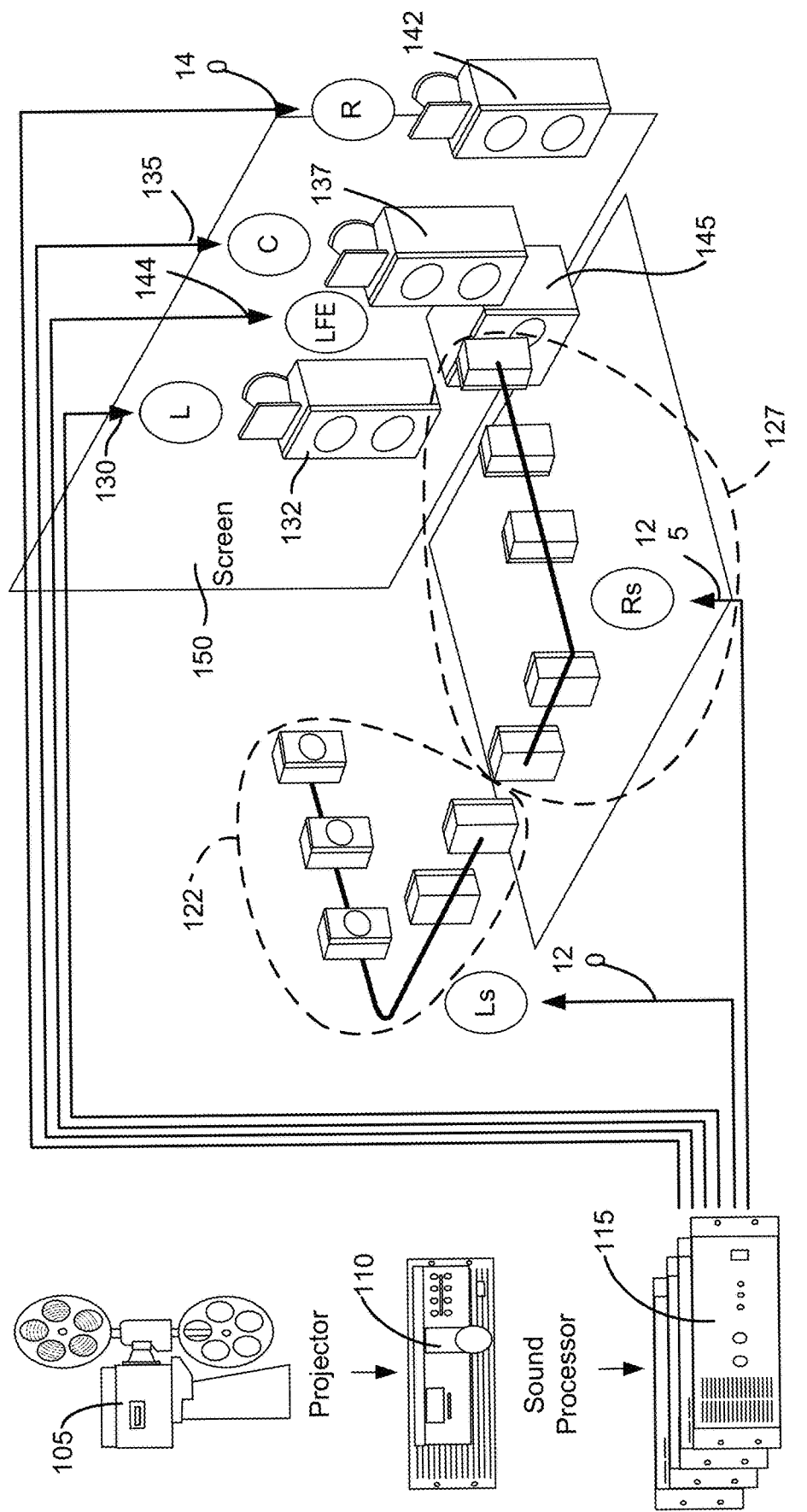
FIG. 1 shows an example of a playback environment having a Dolby Surround 5.1 configuration.

FIG. 1 shows an example of a playback environment having a Dolby Surround 5.1 configuration. In this example, the playback environment is a cinema playback environment. Dolby Surround 5.1 was developed in the 1990s, but this configuration is still widely deployed in home and cinema playback environments. In a cinema playback environment, a projector 105 may be configured to project video images, e.g. for a movie, on a screen 150. Audio data may be synchronized with the video images and processed by the sound processor 110. The power amplifiers 115 may provide speaker feed signals to speakers of the playback environment 100.

The Dolby Surround 5.1 configuration includes a left surround channel 120 for the left surround array 122 and a right surround channel 125 for the right surround array 127. The Dolby Surround 5.1 configuration also includes a left channel 130 for the left speaker array 132, a center channel 135 for the center speaker array 137 and a right channel 140 for the right speaker array 142. In a cinema environment, these channels may be referred to as a left screen channel, a center screen channel and a right screen channel, respectively. A separate low-frequency effects (LFE) channel 144 is provided for the subwoofer 145.

Figure 2:
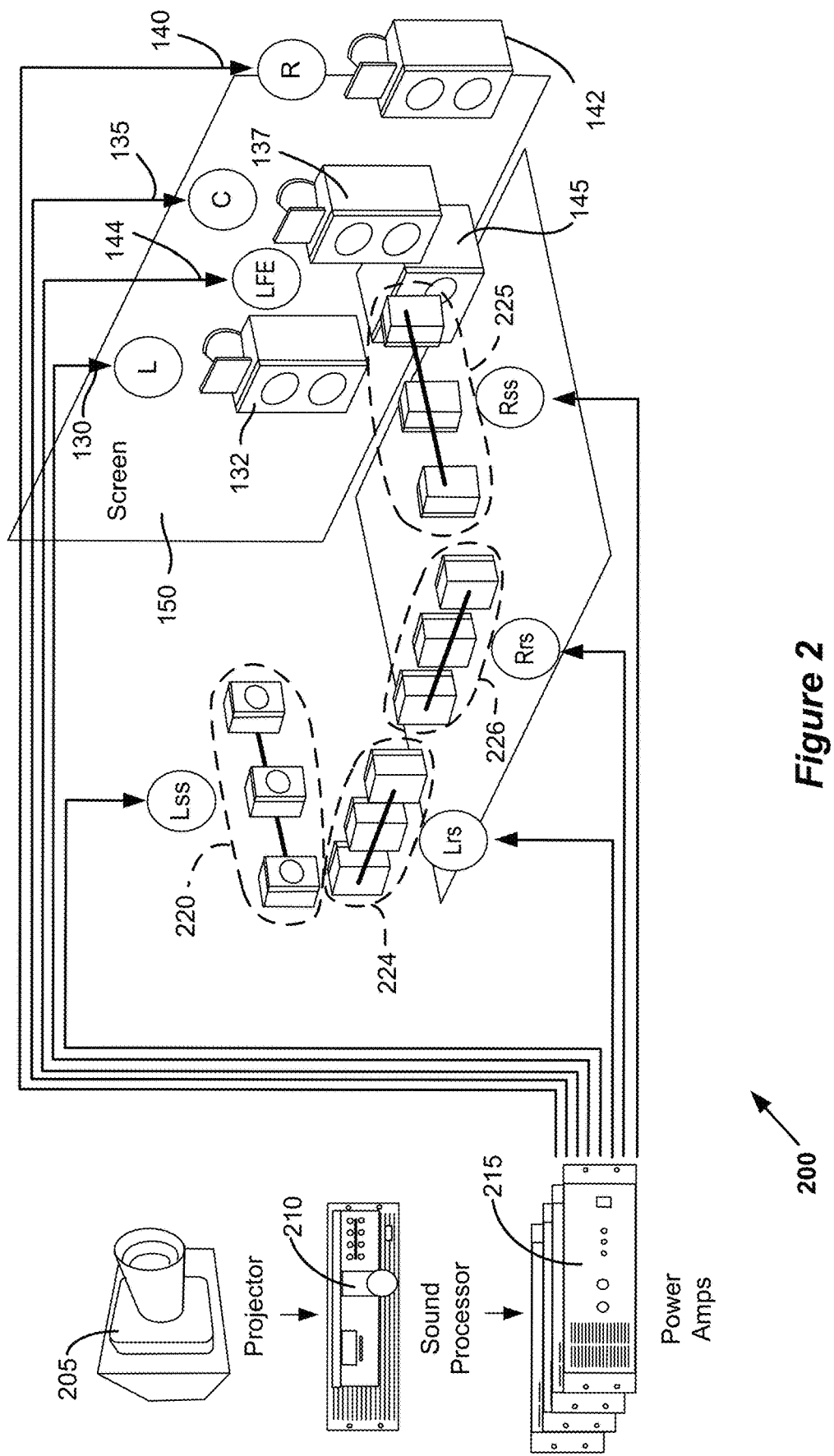
FIG. 2 shows an example of a playback environment having a Dolby Surround 7.1 configuration.

In 2010, Dolby provided enhancements to digital cinema sound by introducing Dolby Surround 7.1. FIG. 2 shows an example of a playback environment having a Dolby Surround 7.1 configuration. A digital projector 205 may be configured to receive digital video data and to project video images on the screen 150. Audio data may be processed by the sound processor 210. The power amplifiers 215 may provide speaker feed signals to speakers of the playback environment 200.

Like Dolby Surround 5.1, the Dolby Surround 7.1 configuration includes a left channel 130 for the left speaker array 132, a center channel 135 for the center speaker array 137, a right channel 140 for the right speaker array 142 and an LFE channel 144 for the subwoofer 145. The Dolby Surround 7.1 configuration includes a left side surround (Lss) array 220 and a right side surround (Rss) array 225, each of which may be driven by a single channel.

However, Dolby Surround 7.1 increases the number of surround channels by splitting the left and right surround channels of Dolby Surround 5.1 into four zones: in addition to the left side surround array 220 and the right side surround array 225, separate channels are included for the left rear surround (Lrs) speakers 224 and the right rear surround (Rrs) speakers 226. Increasing the number of surround zones within the playback environment 200 can significantly improve the localization of sound.

In an effort to create a more immersive environment, some playback environments may be configured with increased numbers of speakers, driven by increased numbers of channels. Moreover, some playback environments may include speakers deployed at various elevations, some of which may be "height speakers" configured to produce sound from an area above a seating area of the playback environment.

Figure 3A:
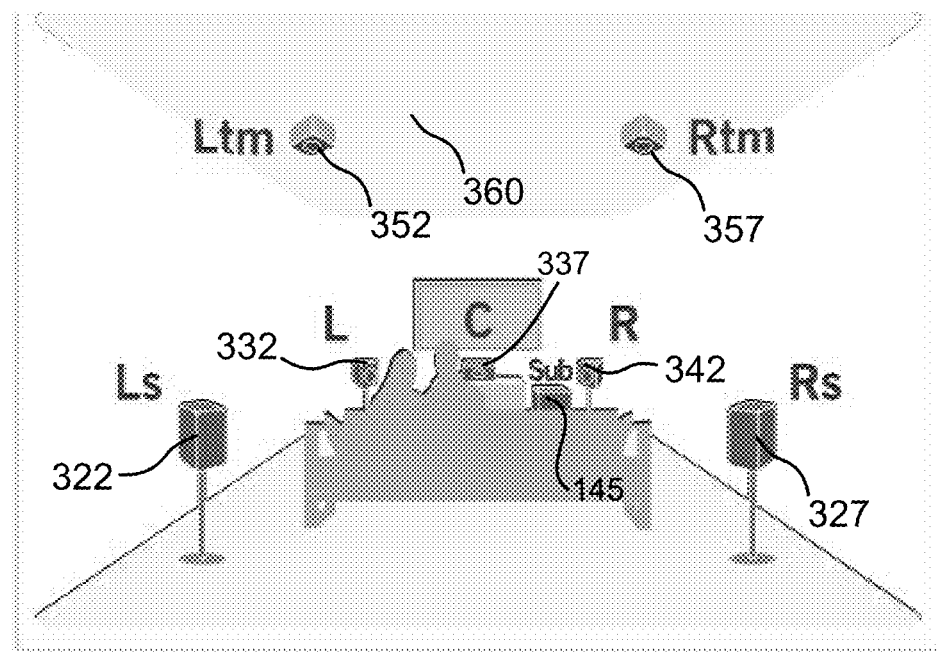
FIGS. 3A and 3B illustrate two examples of home theater playback environments that include height speaker configurations.
Figure 3B:
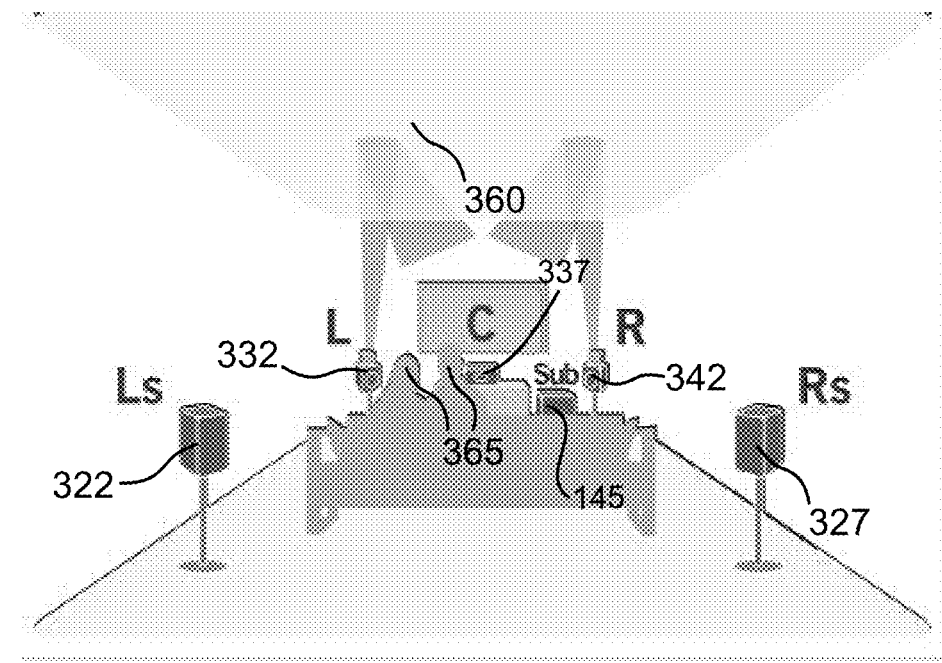

FIGS. 3A and 3B illustrate two examples of home theater playback environments that include height speaker configurations. In these examples, the playback environments 300a and 300b include the main features of a Dolby Surround 5.1 configuration, including a left surround speaker 322, a right surround speaker 327, a left speaker 332, a right speaker 342, a center speaker 337 and a subwoofer 145. However, the playback environment 300 includes an extension of the Dolby Surround 5.1 configuration for height speakers, which may be referred to as a Dolby Surround 5.1.2 configuration.

FIG. 3A illustrates an example of a playback environment having height speakers mounted on a ceiling 360 of a home theater playback environment. In this example, the playback environment 300a includes a height speaker 352 that is in a left top middle (Ltm) position and a height speaker 357 that is in a right top middle (Rtm) position. In the example shown in FIG. 3B, the left speaker 332 and the right speaker 342 are Dolby Elevation speakers that are configured to reflect sound from the ceiling 360. If properly configured, the reflected sound may be perceived by listeners 365 as if the sound source originated from the ceiling 360. However, the number and configuration of speakers is merely provided by way of example. Some current home theater implementations provide for up to 34 speaker positions, and contemplated home theater implementations may allow yet more speaker positions.

Accordingly, the modern trend is to include not only more speakers and more channels, but also to include speakers at differing heights. As the number of channels increases and the speaker layout transitions from 2D to 3D, the tasks of positioning and rendering sounds becomes increasingly difficult.

Accordingly, Dolby has developed various tools, including but not limited to user interfaces, which increase functionality and/or reduce authoring complexity for a 3D audio sound system. Some such tools may be used to create audio objects and/or metadata for audio objects.

Figure 4A:
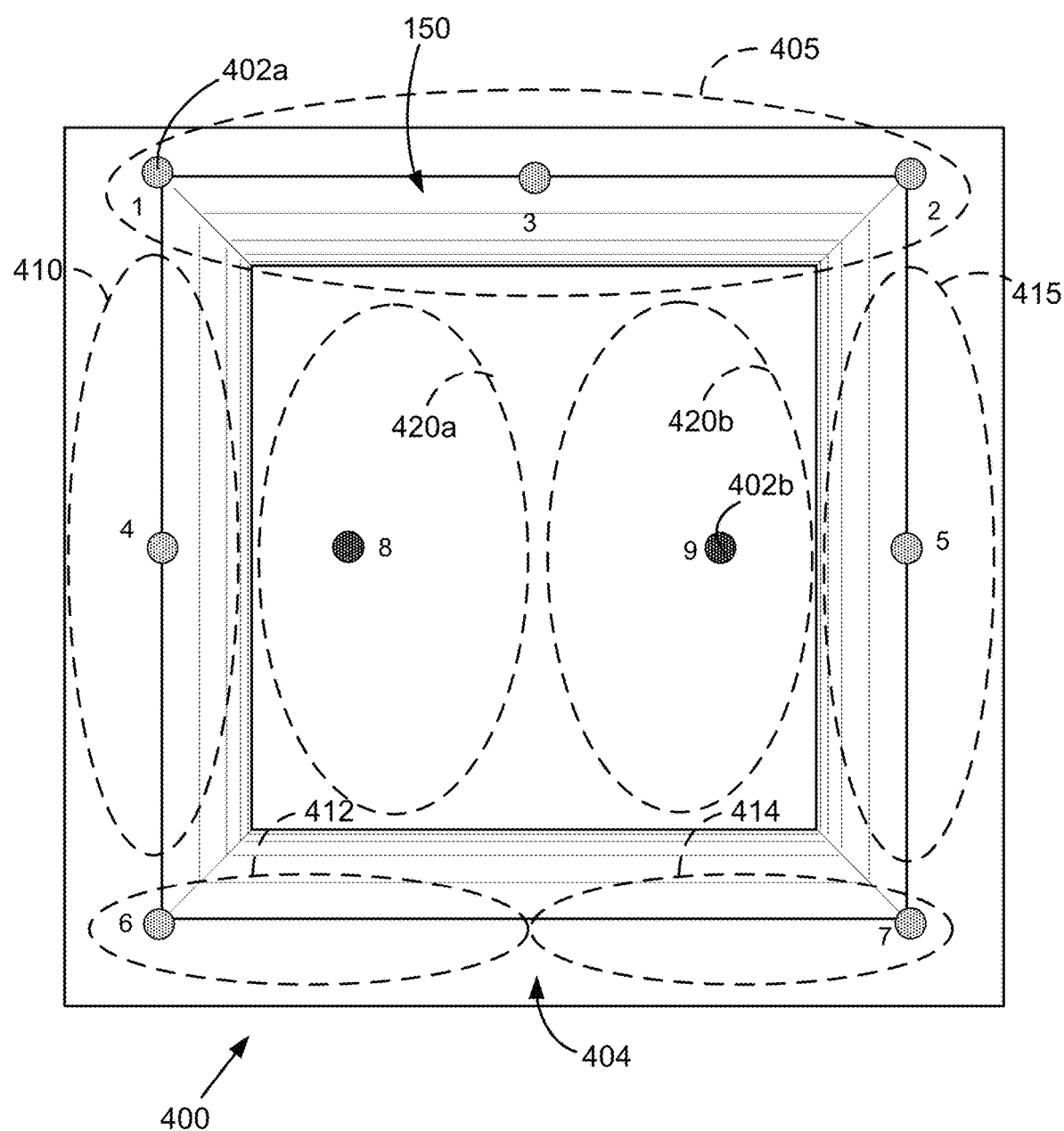
FIG. 4A shows an example of a graphical user interface (GUI) that portrays speaker zones at varying elevations in a virtual playback environment.

FIG. 4A shows an example of a graphical user interface (GUI) that portrays speaker zones at varying elevations in a virtual playback environment. GUI 400 may, for example, be displayed on a display device according to instructions from a control system, according to signals received from user input devices, etc. Some such devices are described below with reference to FIG. 11.

As used herein with reference to virtual playback environments such as the virtual playback environment 404, the term "speaker zone" generally refers to a logical construct that may or may not have a one-to-one correspondence with a speaker of an actual playback environment. For example, a "speaker zone location" may or may not correspond to a particular speaker location of a cinema playback environment. Instead, the term "speaker zone location" may refer generally to a zone of a virtual playback environment. In some implementations, a speaker zone of a virtual playback environment may correspond to a virtual speaker, e.g., via the use of virtualizing technology such as Dolby Headphone,™ (sometimes referred to as Mobile Surround™), which creates a virtual surround sound environment in real time using a set of two-channel stereo headphones. In GUI 400, there are seven speaker zones 402a at a first elevation and two speaker zones 402b at a second elevation, making a total of nine speaker zones in the virtual playback environment 404. In this example, speaker zones 1-3 are in the front area 405 of the virtual playback environment 404. The front area 405 may correspond, for example, to an area of a cinema playback environment in which a screen 150 is located, to an area of a home in which a television screen is located, etc.

Here, speaker zone 4 corresponds generally to speakers in the left area 410 and speaker zone 5 corresponds to speakers in the right area 415 of the virtual playback environment 404. Speaker zone 6 corresponds to a left rear area 412 and speaker zone 7 corresponds to a right rear area 414 of the virtual playback environment 404. Speaker zone 8 corresponds to speakers in an upper area 420a and speaker zone 9 corresponds to speakers in an upper area 420b, which may be a virtual ceiling area. Accordingly, the locations of speaker zones 1-9 that are shown in FIG. 4A may or may not correspond to the locations of speakers of an actual playback environment. Moreover, other implementations may include more or fewer speaker zones and/or elevations.

In various implementations described herein, a user interface such as GUI 400 may be used as part of an authoring tool and/or a rendering tool. In some implementations, the authoring tool and/or rendering tool may be implemented via software stored on one or more non-transitory media. The authoring tool and/or rendering tool may be implemented (at least in part) by hardware, firmware, etc., such as the control system and other devices described below with reference to FIG. 11. In some authoring implementations, an associated authoring tool may be used to create metadata for associated audio data. The metadata may, for example, include data indicating the position and/or trajectory of an audio object in a three-dimensional space, speaker zone constraint data, etc. The metadata may be created with respect to the speaker zones 402 of the virtual playback environment 404, rather than with respect to a particular speaker layout of an actual playback environment. A rendering tool may receive audio data and associated metadata, and may compute audio gains and speaker feed signals for a playback environment. Such audio gains and speaker feed signals may be computed according to an amplitude panning process, which can create a perception that a sound is coming from a position P in the playback environment. For example, speaker feed signals may be provided to speakers 1 through N of the playback environment according to the following equation:

$$x_i(t)=g_i x(t), i=1, \ldots N \quad \text{(Equation 1)}$$

In Equation 1, $x_i(t)$ represents the speaker feed signal to be applied to speaker i, $g_i$ represents the gain factor of the corresponding channel, x(t) represents the audio signal and t represents time. The gain factors may be determined, for example, according to the amplitude panning methods described in Section 2, pages 3-4 of V. Pulkki, *Compensating Displacement of Amplitude-Panned Virtual Sources* (Audio Engineering Society (AES) International Conference on Virtual, Synthetic and Entertainment Audio), which is hereby incorporated by reference. In some implementations, the gains may be frequency dependent. In some implementations, a time delay may be introduced by replacing x(t) by x(t−Δt).

In some rendering implementations, audio reproduction data created with reference to the speaker zones 402 may be mapped to speaker locations of a wide range of playback environments, which may be in a Dolby Surround 5.1 configuration, a Dolby Surround 7.1 configuration, a Hamasaki 22.2 configuration, or another configuration. For example, referring to FIG. 2, a rendering tool may map audio reproduction data for speaker zones 4 and 5 to the left side surround array 220 and the right side surround array 225 of a playback environment having a Dolby Surround 7.1 configuration. Audio reproduction data for speaker zones 1, 2 and 3 may be mapped to the left screen channel 230, the right screen channel 240 and the center screen channel 235, respectively. Audio reproduction data for speaker zones 6 and 7 may be mapped to the left rear surround speakers 224 and the right rear surround speakers 226.

Figure 4B:
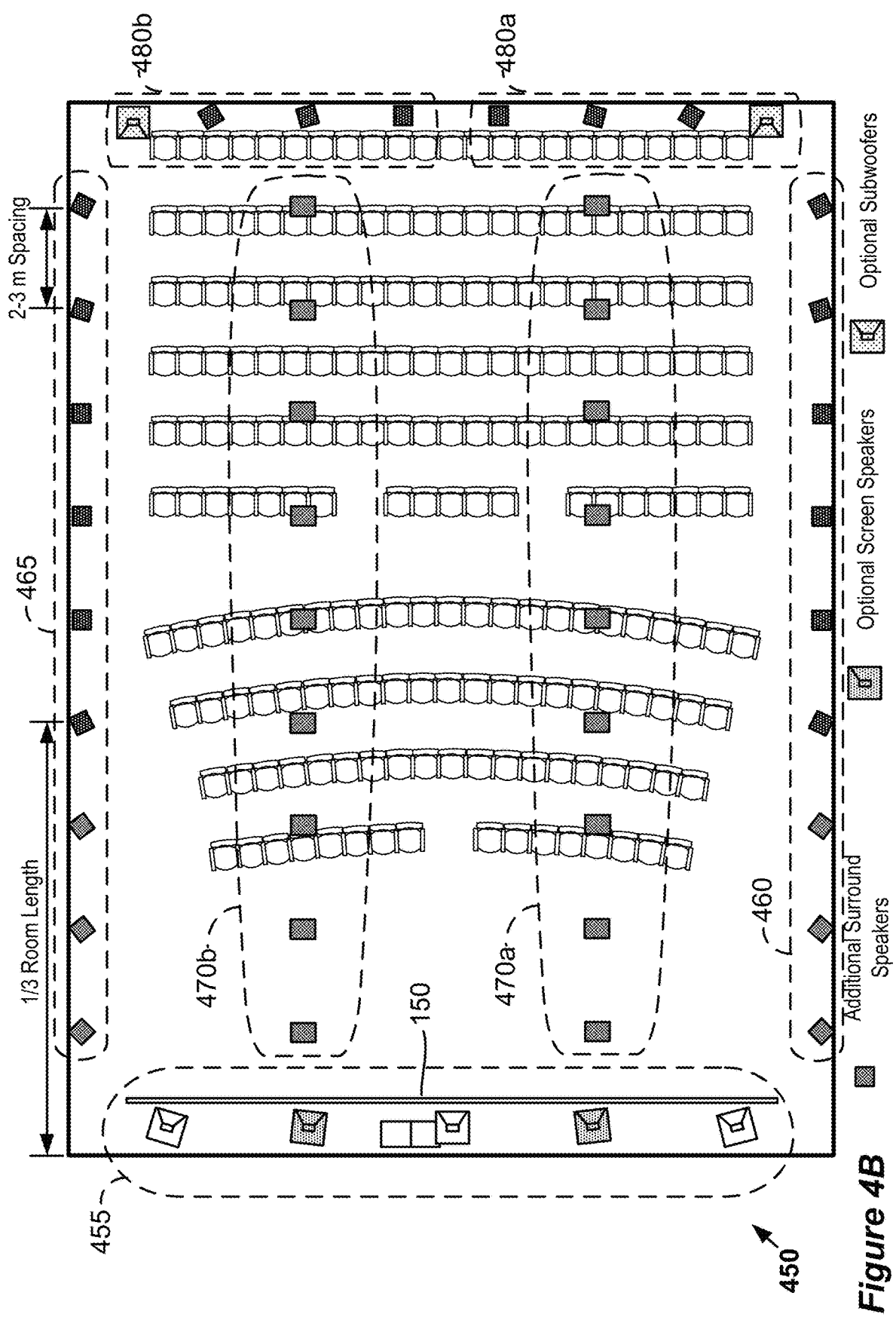
FIG. 4B shows an example of another playback environment.

FIG. 4B shows an example of another playback environment. In some implementations, a rendering tool may map audio reproduction data for speaker zones 1, 2 and 3 to corresponding screen speakers 455 of the playback environment 450. A rendering tool may map audio reproduction data for speaker zones 4 and 5 to the left side surround array 460 and the right side surround array 465 and may map audio reproduction data for speaker zones 8 and 9 to left overhead speakers 470a and right overhead speakers 470b. Audio reproduction data for speaker zones 6 and 7 may be mapped to left rear surround speakers 480a and right rear surround speakers 480b.

In some authoring implementations, an authoring tool may be used to create metadata for audio objects. The metadata may indicate the 3D position of the object, rendering constraints, content type (e.g. dialog, effects, etc.) and/or other information. Depending on the implementation, the metadata may include other types of data, such as width data, gain data, trajectory data, etc. Some audio objects may be static, whereas others may move.

Audio objects are rendered according to their associated metadata, which generally includes positional metadata indicating the position of the audio object in a three-dimensional space at a given point in time. When audio objects are monitored or played back in a playback environment, the audio objects are rendered according to the positional metadata using the speakers that are present in the playback environment, rather than being output to a predetermined physical channel, as is the case with traditional, channel-based systems such as Dolby 5.1 and Dolby 7.1.

In addition to positional metadata, other types of metadata may be necessary to produce intended audio effects. For example, in some implementations, the metadata associated with an audio object may indicate audio object size, which may also be referred to as "width." Size metadata may be used to indicate a spatial area or volume occupied by an audio object. A spatially large audio object should be perceived as covering a large spatial area, not merely as a point sound source having a location defined only by the audio object position metadata. In some instances, for example, a large audio object should be perceived as occupying a significant portion of a playback environment, possibly even surrounding the listener.

In many instances, positional metadata includes sufficient information to allow an audio object to be rendered in a three-dimensional space. For example, the positional metadata may include both azimuthal information (such as an azimuthal angle or coordinates that correspond to a horizontal plane of a reproduction environment, such as x,y coordinates) and some type of height information. Such height information may, for example, include an elevation angle or coordinate information that corresponds to a vertical axis of a reproduction environment, such as z-axis information. Such height information may be used in determining speaker feed signals for height speakers, such as the height speakers shown in FIGS. 3A and 3B, or the overhead speakers shown in 4B.

In the past, such azimuthal and height information was typically based on audio data captured by several microphones positioned at various locations in a recording environment. Some implementations disclosed herein can provide both azimuthal and height information based on audio data captured by a single pair of coincident, vertically-stacked directional microphones. Such azimuthal and height information may be provided as positional metadata of an audio object.

Figure 5:
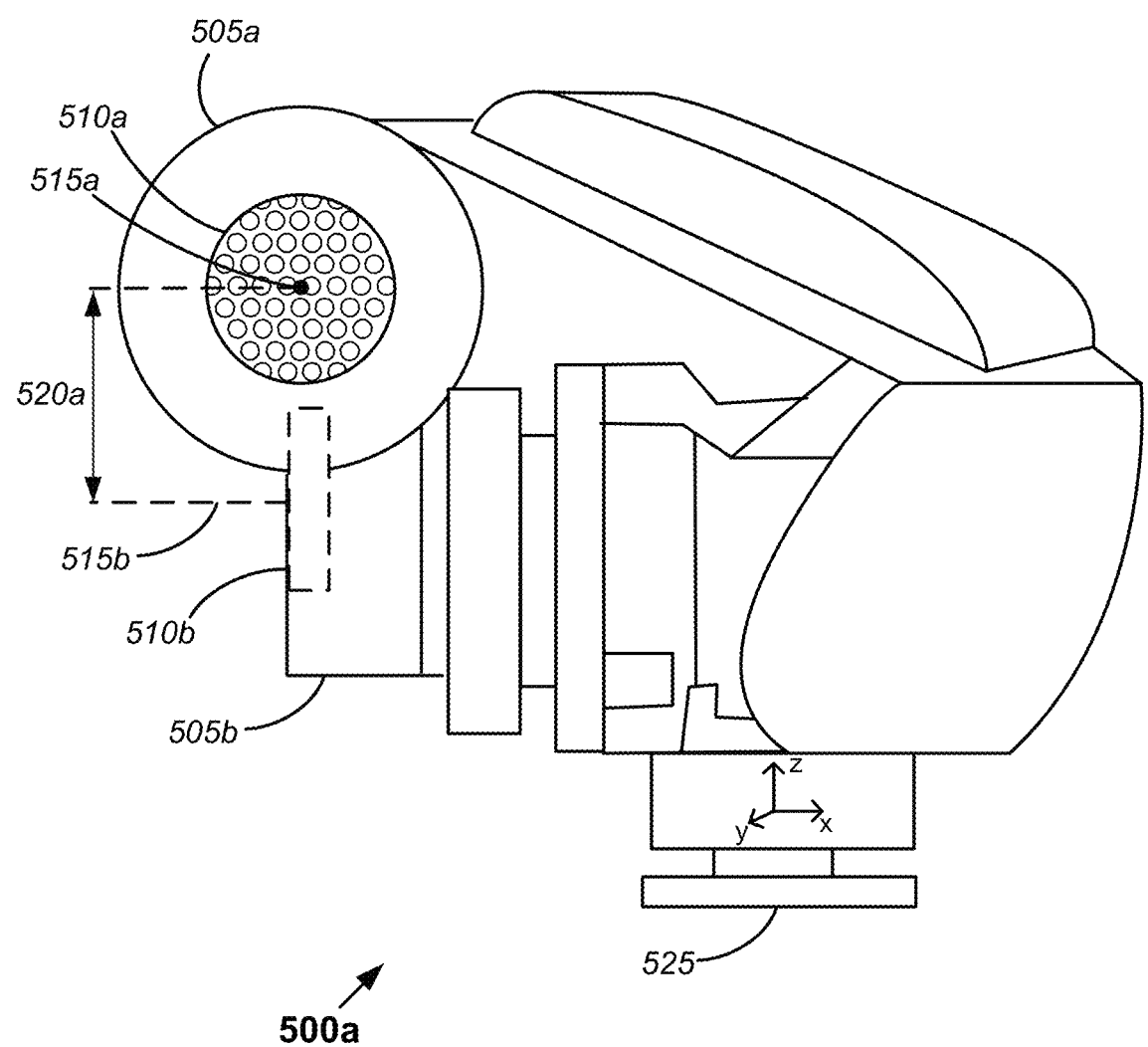
FIG. 5 shows one example of a microphone system that includes a pair of coincident, vertically-stacked directional microphones.

FIG. 5 shows one example of a microphone system that includes a pair of coincident, vertically-stacked directional microphones. In this example, the microphone system 500a includes an XY stereo microphone system that has vertically-stacked microphones 505a and 505b, each of which includes a microphone capsule. The microphone 505a includes the microphone capsule 510a and the microphone 505b includes the microphone capsule 510b, which is not visible in FIG. 5 due to the orientation of the microphone 505b. The longitudinal axis 515a of the microphone capsule 510a extends in and out of the page in this example.

In the example shown in FIG. 5, an xyz coordinate system is shown relative to the microphone system 500a. In this example, the z axis of the coordinate system is a vertical axis. Accordingly, in this example the vertical offset 520a between the longitudinal axis 515a of the microphone capsule 510a and the longitudinal axis 515b of the microphone capsule 510b extends along the z axis. However, the orientation of the xyz coordinate system that is shown in FIG. 5 and the orientations of other coordinate systems disclosed herein are merely shown by way of example. In other implementations, the x or y axis may be a vertical axis. In still other implementations, a cylindrical or spherical coordinate system may be referenced instead of an xyz coordinate system.

In this implementation, the microphone system 500a is capable of being attached to a second device, such as a smart phone. Here, the mount 525 is configured for coupling with the second device. In this example, an electrical connection may be made between the microphone system 500a the second device after the microphone system 500a is physically connected with the second device via the mount 525. Accordingly, audio data corresponding to sounds captured by the microphone system 500a may be conveyed to the second device for storage, further processing, reproduction, etc.

Figure 6:
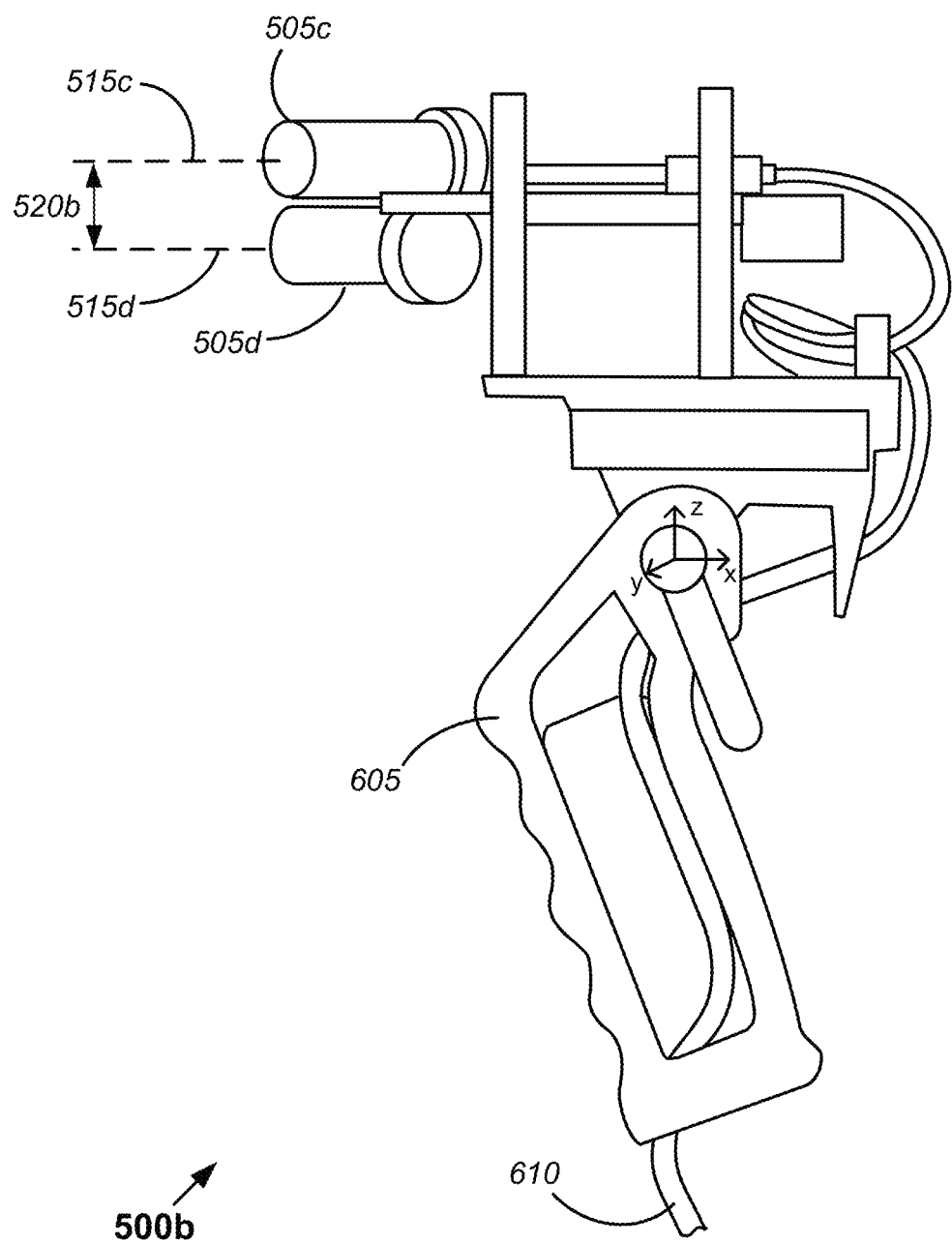
FIG. 6 shows an alternative example of a microphone system that includes a pair of coincident, vertically-stacked directional microphones.

FIG. 6 shows an alternative example of a microphone system that includes a pair of coincident, vertically-stacked directional microphones. In this example, the microphone system 500b includes an XY stereo microphone system that has vertically-stacked microphone capsules 505c and 505d, each of which includes a microphone that is not visible in FIG. 6: the microphone 505c includes the microphone capsule 510c and the microphone 505d includes the microphone capsule 510d. In this example, the vertical offset 520b between the longitudinal axis 515c of the microphone capsule 510c and the longitudinal axis 515d of the microphone capsule 510d extends along the z axis of the coordinate system shown in FIG. 6.

The microphone system 500b includes a handle 605, which is configured to be held by a user. In this example, an electrical connection may be made between the microphone system 500b and a second device via the cable 610. Accordingly, audio data corresponding to sounds captured by the microphone system 500b may be conveyed to the second device for storage, further processing, reproduction, etc. In some alternative implementations, a microphone system may be capable of providing audio data to a second device via a wireless interface.

Figure 7:
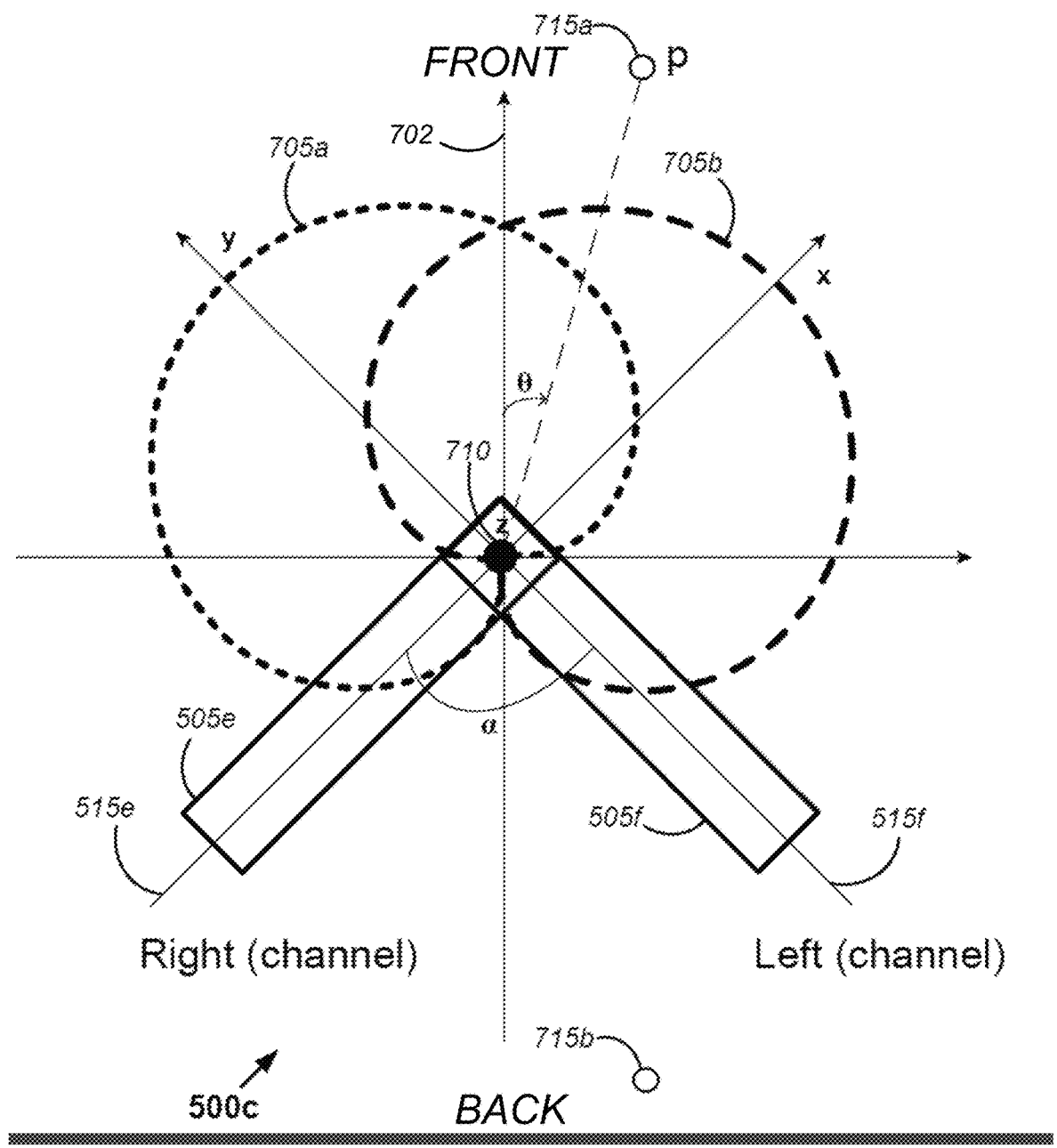
FIG. 7 shows another example of a microphone system that includes a pair of coincident, vertically-stacked directional microphones.

FIG. 7 shows another example of a microphone system that includes a pair of coincident, vertically-stacked directional microphones. The microphone system 500c includes vertically-stacked microphones 505e and 505f, each of which includes a microphone capsule that is not visible in FIG. 7: the microphone 505e includes the microphone capsule 510e and the microphone 505f includes the microphone capsule 510f. In this example, the longitudinal axis 515e of the microphone capsule 510e and the longitudinal axis 515f of the microphone capsule 510f extend in the x,y plane.

Here, the z axis extends in and out of the page. In this example, the z axis passes through the intersection point 710 of the longitudinal axis 515e and the longitudinal axis 515f. This geometric relationship is one example of the microphones of microphone system 500c being "coincident." The longitudinal axis 515e and the longitudinal axis 515f are vertically offset along the z axis, although this offset is not visible in FIG. 7. The longitudinal axis 515e and the longitudinal axis 515f are separated by an angle $\alpha$, which may be 90 degrees, 120 degrees or another angle, depending on the particular implementation.

A stereo effect (including azimuthal angle determination) may be based, at least in part, on differences in sound pressure level (which also may be referred to herein as differences in intensity or amplitude) between the sound captured by the microphone capsule 510e and sound captured by the microphone capsule 510f. Some examples are described below.

In this example, the microphone 505e and the microphone 505f are directional microphones. A microphone's degree of directionality may be represented by a "polar pattern," which indicates how sensitive the microphone is to sounds arriving at different angles relative a microphone's longitudinal axis. The polar patterns 705a and 705b illustrated in FIG. 7 represent the loci of points that produce the same signal level output in the microphone if a given sound pressure level (SPL) is generated from that point. In this example, the polar patterns 705a and 705b are cardioid polar patterns. In alternative implementations, a microphone system may include coincident, vertically-stacked microphones having supercardioid or hypercardioid polar patterns, or other polar patterns.

The directionality of microphones may sometimes be used herein to reference a "front" area and a "back" area. The sound source 715a shown in FIG. 7 is located in an area that will be referred to herein as a front area, because the sound source 715a is located in an area in which the microphones are relatively more sensitive, as indicated by the greater extension of the polar patterns along the longitudinal axes 515e and 515f. The sound source 715b is located in an area that will be referred to herein as a back area, because it is an area in which the microphones are relatively less sensitive.

Figure 8:
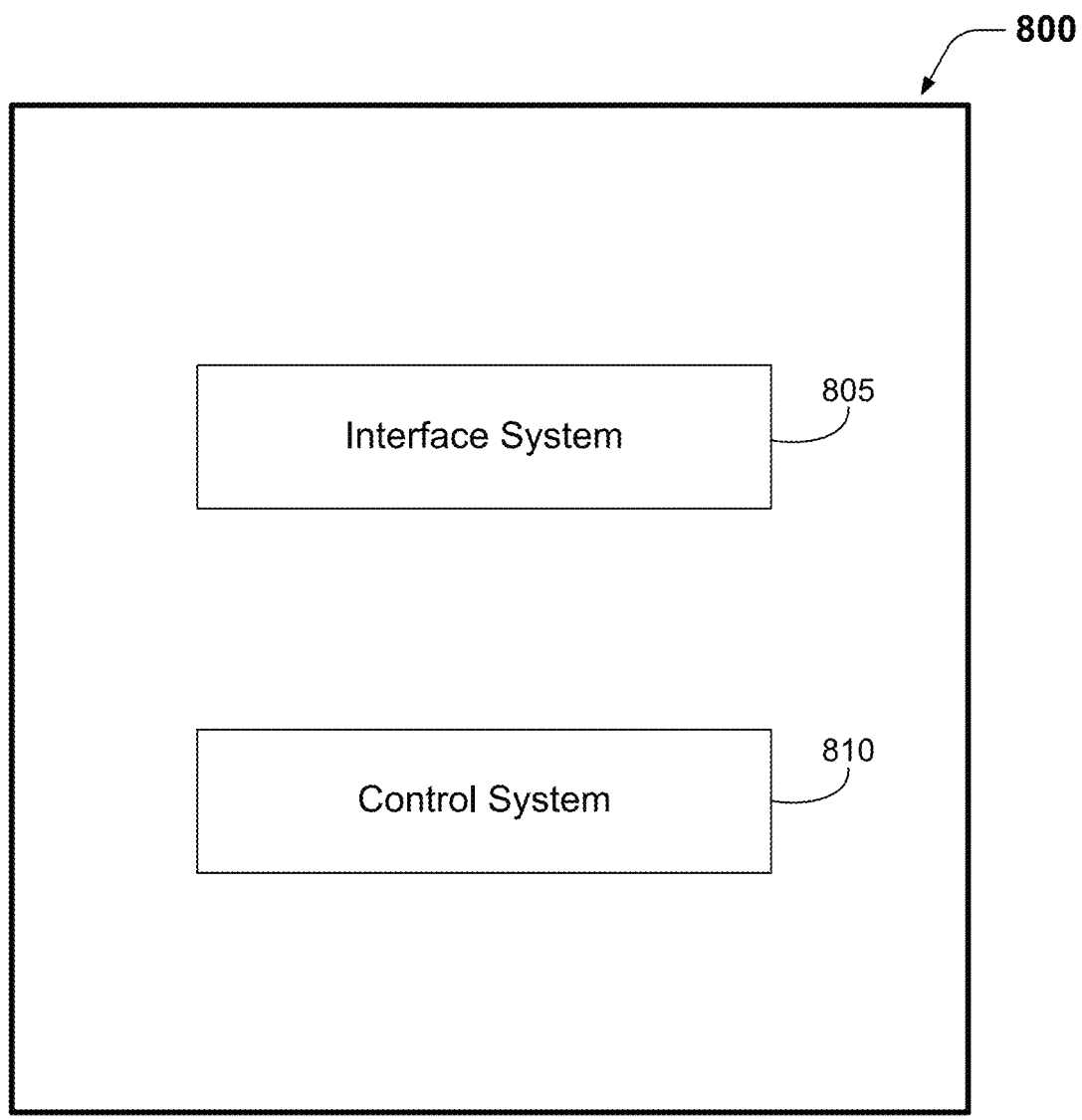
FIG. 8 is a block diagram that shows examples of components of an apparatus capable of implementing various aspects of this disclosure.

FIG. 8 is a block diagram that shows examples of components of an apparatus capable of implementing various aspects of this disclosure. The types and numbers of components shown in FIG. 8 are merely shown by way of example. Alternative implementations may include more, fewer and/or different components. The apparatus 800 may, for example, be an instance of a desktop computer, a laptop computer, a smart phone, a server, etc. In some examples, the apparatus 800 may be a component of another device. For example, in some implementations the apparatus 800 may be a component of a server, such as a line card.

In this example, the apparatus 800 includes an interface system 805 and a control system 810. The interface system 805 may include one or more network interfaces, one or more interfaces between the control system 810 and a memory system, one or more user interfaces and/or one or more external device interfaces (such as one or more universal serial bus (USB) interfaces). The control system 810 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components. In some implementations, the control system 810 may be capable of performing, at least in part, the methods disclosed herein.

Figure 9:
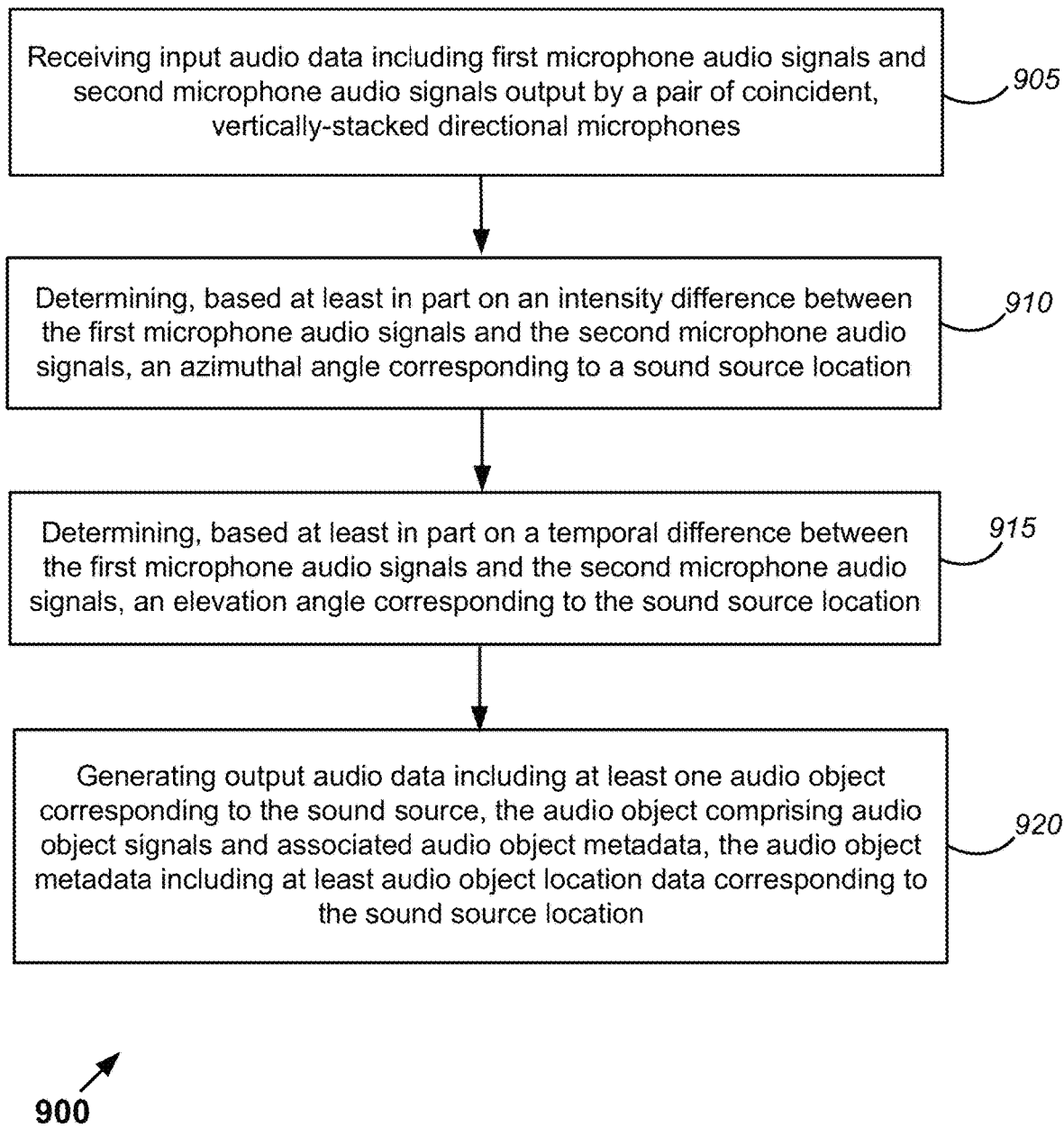
FIG. 9 is a flow diagram that outlines one example of a method that may be performed by an apparatus such as that shown in FIG. 8.

FIG. 9 is a flow diagram that outlines one example of a method that may be performed by an apparatus such as that shown in FIG. 8. The blocks of method 900, like other methods described herein, are not necessarily performed in the order indicated. Moreover, such methods may include more or fewer blocks than shown and/or described.

In this implementation, block 905 involves receiving input audio data including first microphone audio signals and second microphone audio signals output by a pair of coincident vertically stacked directional microphones. For example, the first microphone audio signals and second microphone audio signals may be output by microphones such as those shown in FIGS. 5-7 and described above, or by microphones such as those shown in FIG. 10 and described below. In some examples, block 905 may involve receiving input audio data from an XY stereo microphone system. According to some implementations, the control system 810 of FIG. 8 may be capable of receiving the audio data, via the interface system 805, in block 905. In some implementations, the audio data may be pulse-code modulation (PCM) audio data, such as linear pulse-code modulation (LPCM) audio data.

Some examples may include an optional process of upsampling the input audio data. As used herein, the term "upsampling" refers to an interpolation process. For example, when upsampling is performed on a sequence of samples of a continuous function or signal, upsampling can produce an approximation of a sequence of samples that would have been obtained by sampling the signal at a higher rate. In some examples, the input audio data may be upsampled by 2×, by 4×, by 8×, by 16×, etc. In one example, the input audio data may be upsampled 4× from 48 KHz to 192 KHz. According to some such examples, a process of upsampling the input audio data may be implemented after receiving the input audio data in block 905, but before the process of block 915. In some examples, the input audio data may be upsampled prior to the operations of block 910. Some such implementations involve a subsequent downsampling operation that restores the audio data to its original sample rate. The downsampling operation may, for example, occur between blocks 915 and 920 of FIG. 9. According to some implementations, the control system 810 of FIG. 8 may be capable of performing the upsampling.

Moreover, some implementations may involve converting the input audio data from the time domain into the frequency domain. According to some such examples, from left and right microphone audio signals L and R, a set of frequency-domain signals L(f),R(f) may be obtained for each subband f. The left and right microphone audio signals may correspond to the first and second microphone audio signals that are received in block 905. In some implementations, the control system 810 of FIG. 8 may be capable of converting the input audio data from the time domain into the frequency domain.

Some such implementations may involve splitting the input audio data into multiple sub-bands of the frequency domain. For example, some such implementations may involve splitting the input audio data into 10 sub-bands, 18 sub-bands, 25 sub-bands, 30 sub-bands, 48 sub-bands, 60 sub-bands, 70 sub-bands, or some other number of sub-bands. Some such implementations may involve splitting the input audio data into multiple sub-bands after an upsampling process but before the process of block 910 and/or block 915. According to some implementations, the control system 810 of FIG. 8 may be capable of splitting the input audio data into multiple sub-bands of the frequency domain. For instance, in Fourier frequency domain each subband would comprise a number of complex Fourier coefficients or 'bins'.

In this example, block 910 involves determining, based at least in part on an intensity difference between the first microphone audio signals and the second microphone audio signals, an azimuthal angle corresponding to a sound source location. In some examples the "intensity difference" may be, or may correspond with, a ratio of intensities, or levels, between the first microphone audio signals and the second microphone audio signals. According to some implementations, the control system 810 of FIG. 8 may be capable of determining the azimuthal angle corresponding to a sound source location, based at least in part on an intensity difference between the first microphone audio signals and the second microphone audio signals. Block 910 may be better understood with reference to FIGS. 7, 10 and 11.

Figure 10:
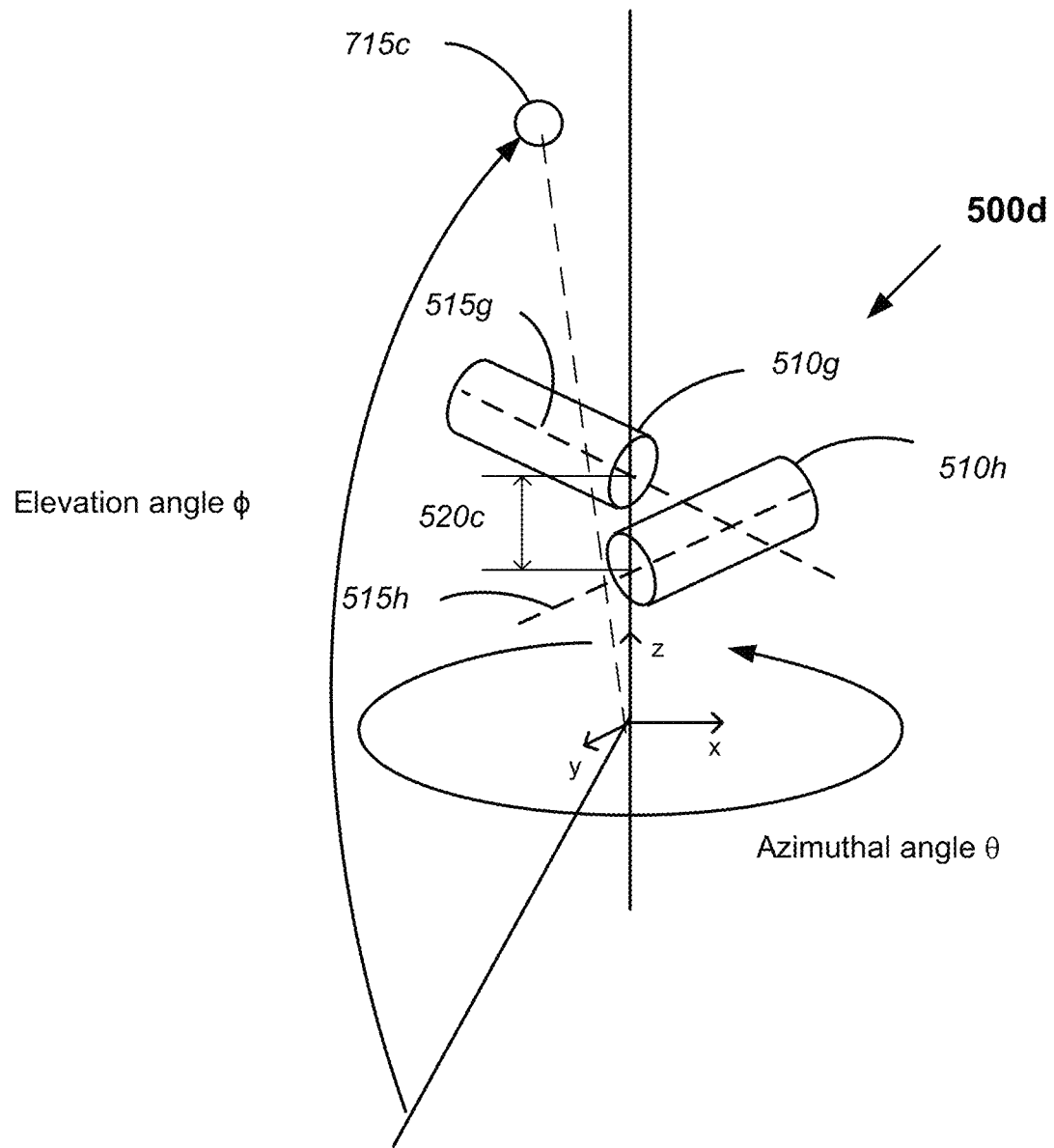
FIG. 10 shows an example of azimuthal angles and elevation angles relative to a microphone system that includes pair of coincident, vertically-stacked directional microphones.

FIG. 10 shows an example of azimuthal angles and elevation angles relative to a microphone system that includes pair of coincident, vertically-stacked directional microphones. For the sake of simplicity, only the microphone capsules 510g and 510h of the microphone system 500d are shown in this example, without support structures, electrical connections, etc. Here, the vertical offset 520c between the longitudinal axis 515g of the microphone capsule 510g and the longitudinal axis 515h of the microphone capsule 510h extends along the z axis. The azimuthal angle corresponding to the position of a sound source, such as the sound source 715b, is measured in a plane that is parallel to the x,y plane in this example. This plane may be referenced herein as the "azimuthal plane." Accordingly, the elevation angle is measured in a plane that is perpendicular to the x,y plane in this example.

Figure 11:
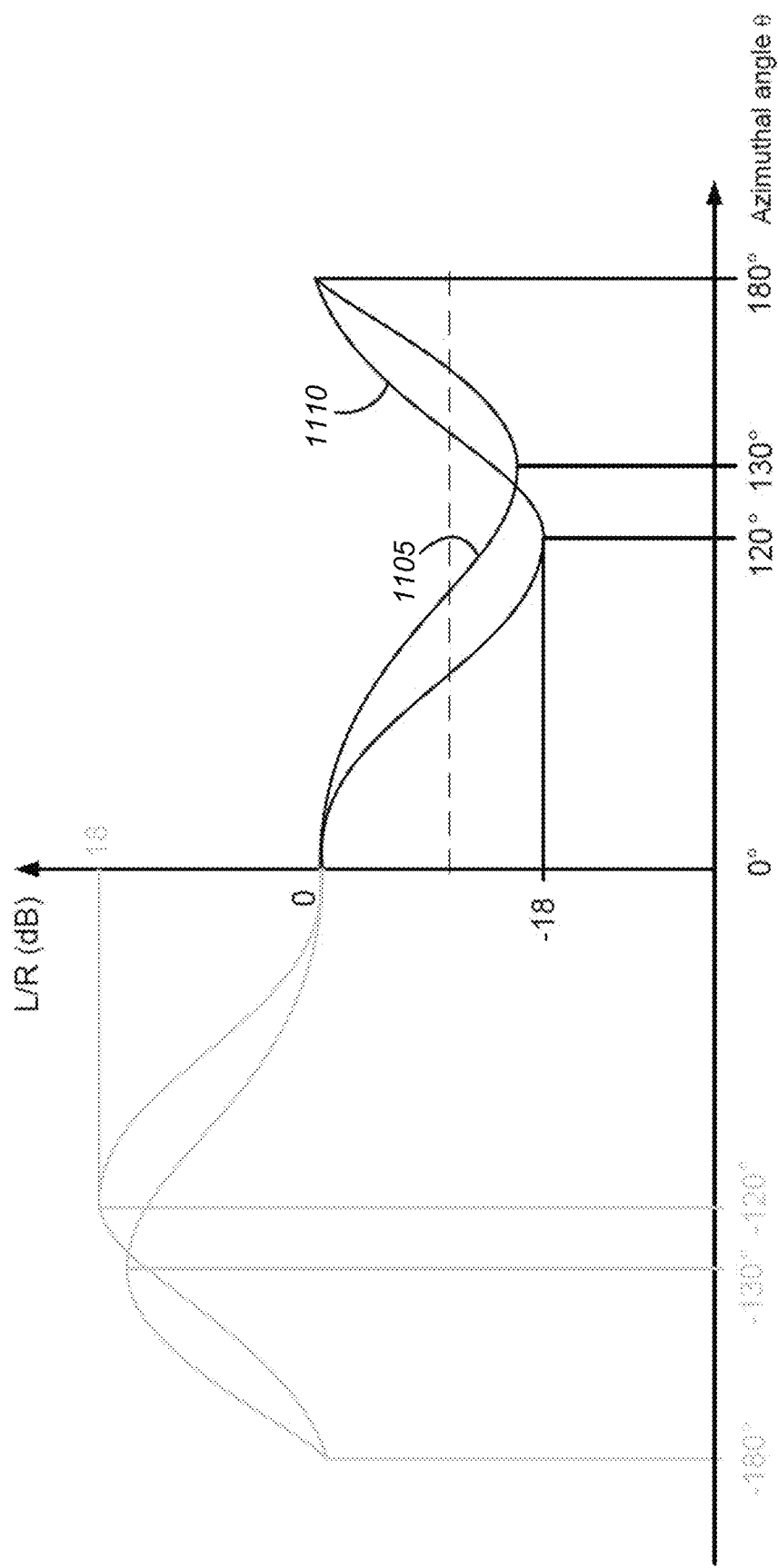
FIG. 11 is a graph that shows examples of curves indicating relationships between an azimuthal angle and a ratio of intensities, or levels, between right and left microphone audio signals (the L/R ratio) produced by a pair of coincident, vertically-stacked directional microphones.

FIG. 11 is a graph that shows examples of curves indicating relationships between an azimuthal angle and a ratio of intensities, or levels, between right and left microphone audio signals (the L/R energy ratio) produced by a pair of coincident, vertically-stacked directional microphones. The right and left microphone audio signals are examples of the first and second microphone audio signals referenced elsewhere herein. In this example, the curve 1105 corresponds to the relationship between the azimuthal angle and the L/R ratio for signals produced by a pair of coincident, vertically-stacked directional microphones, having longitudinal axes separated by 90 degrees in the azimuthal plane.

Referring to FIG. 7, for example, the longitudinal axes 515e and 515f are separated by an angle $\alpha$ in the azimuthal plane. The sound source 715a shown in FIG. 7 is at an azimuthal angle $\theta$, which is measured from an axis 702 that is midway between the longitudinal axis 515e and the longitudinal axis 515f. The curve 1105 corresponds to the relationship between the azimuthal angle and the L/R energy ratio for signals produced by a similar pair of coincident, vertically-stacked directional microphones, wherein $\alpha$ is 90 degrees. The curve 1110 corresponds to the relationship between the azimuthal angle and the L/R ratio for signals produced by another pair of coincident, vertically-stacked directional microphones, wherein $\alpha$ is 120 degrees.

It may be observed that in the example shown in FIG. 11, both of the curves 1105 and 1110 have an inflection point at an azimuthal angle of zero degrees, which in this example corresponds to an azimuthal angle at which a sound source is positioned along an axis that is midway between the longitudinal axis of the left microphone and the longitudinal axis of the right microphone. As shown in FIG. 11, local maxima occur at azimuthal angles of −130 degrees or −120 degrees In the example shown in FIG. 11, the curves 1105 and 1110 also have local minima corresponding to azimuthal angles of 130 degrees and 120 degrees, respectively. The positions of these minima depend in part on whether a is 90 degrees or 120 degrees, but also depend on the directivity patterns of the microphones. The positions of the maxima and minima that are shown in FIG. 11 generally correspond with microphone directivity patterns such as those indicated by the polar patterns 705a and 705b shown in FIG. 7. The positions of the maxima and minima would be somewhat different for microphones having different directivity patterns.

As noted above, some implementations may involve transforming input audio from the time domain to the frequency domain and splitting the frequency domain data into sub-bands. From the left microphone audio signals L and the right microphone audio signals R, some such implementations involve generating a set of frequency domain signals L(f) and R(f) for each subband f. According to some examples, determining the azimuthal angle of a sound source location in block 910 may involve determining an energy ratio, for each subband f, between L(f) and R(f) (e.g. by averaging the energy of every complex coefficient in the subband). Further examples and details are provided below.

Referring again to FIG. 10, it may be seen that the sound source 715c is located above the microphone system 500d, at an elevation angle (p. Because of the vertical offset 520c between the microphone capsule 510g and the microphone capsule 510h, sound emitted by the sound source 715c will arrive at the microphone capsule 510g before arriving at the microphone capsule 510h. Therefore, there will be a temporal difference between the microphone audio signals from the microphone capsule 510g that are responsive to sound from the sound source 715c and the corresponding microphone audio signals from the microphone capsule 510g that are responsive to sound from the sound source 715c.

Accordingly, in the implementation shown in FIG. 9, block 915 involves determining, based at least in part on a temporal difference between the first microphone audio signals and the second microphone audio signals, an elevation angle corresponding to the sound source location. The elevation angle may be determined according to a vertical distance, also referred to herein as a vertical offset, between a first microphone and a second microphone of the pair of coincident, vertically-stacked directional microphones. According to some implementations, the control system 810 of FIG. 8 may be capable of determining an elevation angle corresponding to the sound source location, based at least in part on a temporal difference between the first microphone audio signals and the second microphone audio signals.

In some examples, the method 900 may involve determining a cross-correlation function between the first microphone audio signals and the second microphone audio signals. Some such examples may involve upsampling values of the cross-correlation function. In some implementations, the control system 810 of FIG. 8 may be capable of determining a cross-correlation function between the first microphone audio signals and the second microphone audio signals. The control system 810 may be capable of upsampling values of the cross-correlation function. Further examples and details are provided below.

In this implementation, block 920 involves generating output audio data. Alternative implementations may involve generating channel-based output audio data. However, in this example, the output audio data that is generated in block 920 includes at least one audio object corresponding to a sound source. In this implementation, the audio object includes audio object signals and associated audio object metadata. Here, the audio object metadata includes, at least, audio object location data corresponding to the sound source location. The audio object location data may be based, at least in part, on the azimuthal angle and the elevation angle that are determined in blocks 910 and 915. In some implementations, block 920 may involve generating a plurality of audio objects.

As noted above, some implementations of method 900 may involve transforming the input audio data that is received in block 905 into the frequency domain and splitting the input audio data into sub-bands. According to some such implementations, block 920 may involve generating an audio object for each of the sub-bands. For example, a plurality of audio objects may be generated in block 920 that correspond to a single sound source. Each audio object may correspond to a different sub-band. In some implementations, the control system 810 of FIG. 8 may be capable of performing the operations of block 920.

However, in some examples method 900 may involve an audio object "clustering" or "scene simplification" process. For example, if the generating process of block 920 involves generating N audio objects, in some implementations method 900 may involve performing an audio object clustering process on the N audio objects that outputs fewer than N audio objects. According to some implementations, the control system 810 of FIG. 8 may be capable of performing an audio object clustering process. Some examples of clustering are provided below.

Some or all of the methods described herein may be performed by one or more devices according to instructions (e.g., software) stored on non-transitory media. Such non-transitory media may include memory devices such as those described herein, including but not limited to random access memory (RAM) devices, read-only memory (ROM) devices, etc. Accordingly, various innovative aspects of the subject matter described in this disclosure can be implemented in a non-transitory medium having software stored thereon. The software may, for example, include instructions for controlling at least one device to process audio data. The software may, for example, be executable by one or more components of a control system such as the control system 810 of FIG. 8.

According to some examples, the software may include instructions for receiving input audio data including first microphone audio signals and second microphone audio signals output by a pair of coincident, vertically-stacked directional microphones. In some examples, the software may include instructions for determining, based at least in part on an intensity difference between the first microphone audio signals and the second microphone audio signals, an azimuthal angle corresponding to a sound source location. According to some implementations, the software may include instructions for determining, based at least in part on a temporal difference between the first microphone audio signals and the second microphone audio signals, an elevation angle corresponding to the sound source location. In some such implementations, the software may include instructions for generating output audio data including at least one audio object corresponding to a sound source. The audio object may include audio object signals and associated audio object metadata. The audio object metadata may include at least audio object location data corresponding to the sound source location.

Figure 12:
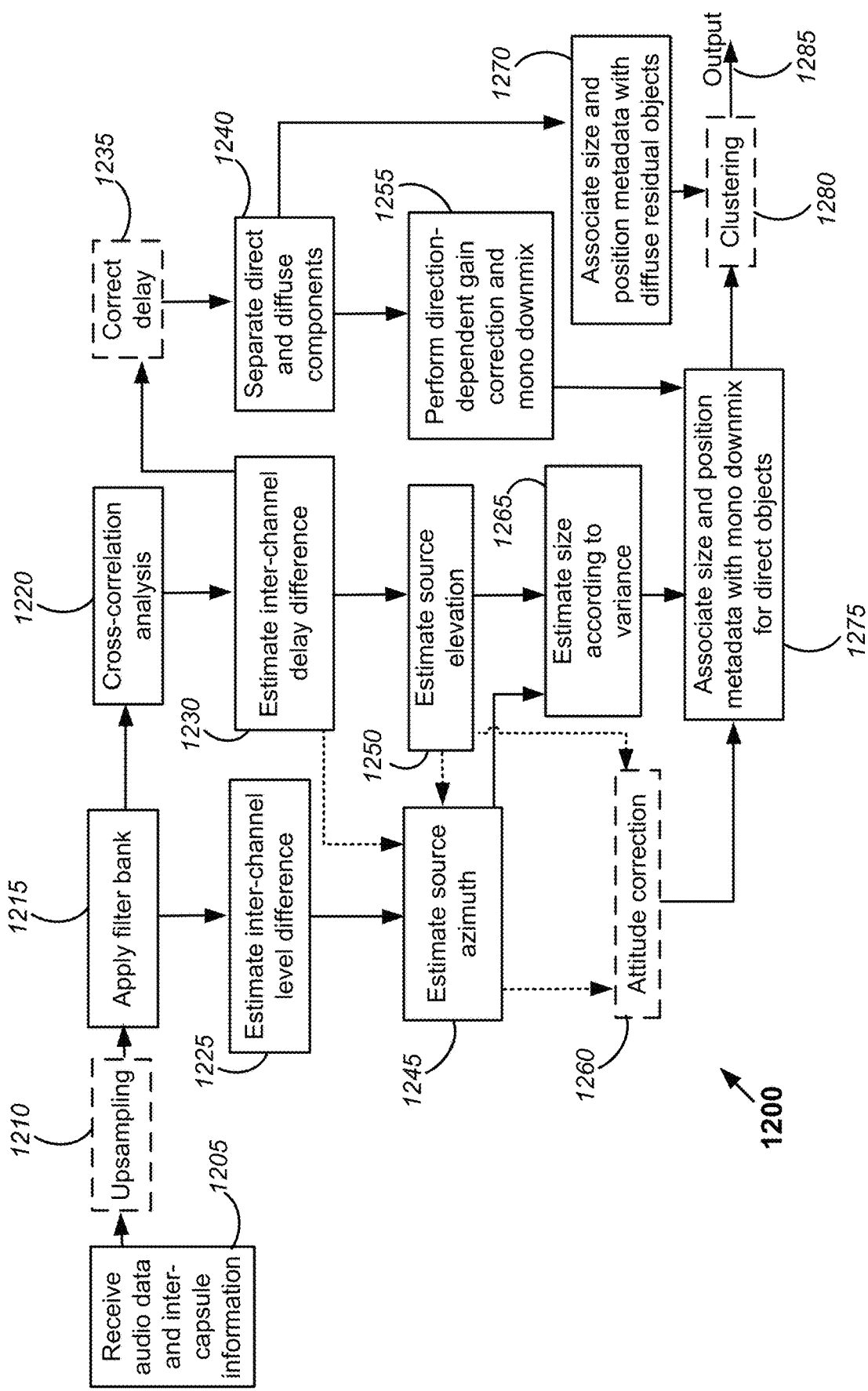
FIG. 12 is a flow diagram that outlines another example of a method that may be performed by an apparatus such as that shown in FIG. 8.

FIG. 12 is a flow diagram that outlines another example of a method that may be performed by an apparatus such as that shown in FIG. 8. Method 1200 may be performed by one or more devices according to instructions (e.g., software) stored on non-transitory media. The software may, for example, be executable by one or more components of a control system such as the control system 810 of FIG. 8. The blocks of method 1200, like other methods described herein, are not necessarily performed in the order indicated. Moreover, such methods may include more or fewer blocks than shown and/or described.

In this implementation, block 1205 involves receiving input audio data including first microphone audio signals and second microphone audio signals output by a pair of coincident, vertically-stacked directional microphones. For example, the first microphone audio signals and second microphone audio signals may be output by microphones such as those shown in FIGS. 5-7 or FIG. 10 and described above. In some examples, block 1205 may involve receiving input audio data from an XY stereo microphone system. In some implementations, the audio data may be pulse-code modulation (PCM) audio data, such as linear pulse-code modulation (LPCM) audio data.

In this example, block 1205 also involves receiving inter-capsule information. The inter-capsule information may, for example, indicate the vertical offset between the longitudinal axes of the coincident, vertically-stacked directional microphones.

In the example shown in FIG. 12, optional block 1210 involves a process of upsampling the received audio data. Block 1210 may involve an interpolation process such as that described above with reference to FIG. 9, which may be applied in the time domain.

According to this implementation, block 1215 involves applying a filter bank. Block 1215 may involve applying an array of band-pass filters that separates the input audio data into multiple components, each component corresponding to a single frequency sub-band of the input audio data. The details of block 1215 may differ, depending on the particular implementation. According to some implementations, block 1215 may involve performing a sequence of Fast Fourier Transforms (FFTs) on overlapping segments of an input audio data stream. In some examples, block 1215 may involve applying a cascaded quadrature mirror filter (CQMF) process to the input audio data, or performing other operations on the input audio data. According to some examples, from left and right microphone audio signals L and R in the time domain, a set of frequency-domain signals $L(f),R(f)$ may be obtained for each subband f. The left and right microphone audio signals may correspond to the first and second microphone audio signals that are received in block 1205, or to upsampled versions of these microphone audio signals. In this example, the output from block 1215 is provided to blocks 1220 and 1225.

In this implementation, block 1220 involves a cross-correlation analysis. According to some examples, block 1220 may involve determining a cross-correlation function between the first microphone audio signals and the second microphone audio signals of the audio data. For example, block 1220 may involve computing the cross-correlation between $L(f)$ and $R(f)$ to determine an inter-channel delay. With typical vertically-stacked XY microphones the inter-channel delay may be positive or negative, depending on whether the corresponding sound source is above or below the microphones. Assuming $L(f)$ and $R(f)$ are complex-valued, frequency domain signals, the cross correlation function can be obtained by the inverse Fourier transform of $L(f)*R(f)$, where * represents the complex conjugate operator. The output of block 1220 is provided to block 1230 in this example.

In the example shown in FIG. 12, block 1230 involves estimating an inter-channel delay difference between audio signals of the left and right microphones. According to this example, block 1230 involves estimating an inter-channel delay difference between each sub-band of the audio signals of the left and right microphones. For example, the inter-channel delay difference may be determined according to the maximum of the cross correlation function, e.g., as the inter-channel (signed integer) delay $d(f)$ (expressed in audio samples). In some implementations, block 1230 may involve providing an improved (fractional) delay estimation by fitting a function, such as a parabolic function, around the maximum value of the cross-correlation function. The search for the maximum correlation may be restricted to the physically realizable range defined by the vertical offset between the left and right microphones.

In some implementations, block 1230 may involve smoothing the obtained delay from frame to frame of the audio data. According to some such implementations, block 1220 may involve applying a differential equation, such as a leaky integrator equation. A leaky integrator equation can be used to describe a component or system that takes the integral of an input and gradually "leaks" a small amount of output over time. A leaky integrator equation may be expressed as $dx/dt=-Ax+C$, wherein C represents the input and A represents the rate of the "leak." A leaky integrator equation is equivalent to a first-order low pass filter. The output of block 1230 is provided to block 1250 in this example.

According to this implementation, block 1250 involves estimating, based at least in part on the inter-channel delay difference estimated in block 1230, an elevation angle corresponding to a sound source location. According to this example, block 1250 involves receiving an estimated inter-channel delay difference for each sub-band of the audio signals of the left and right microphones and estimating a corresponding elevation angle for each sub-band.

For example, based in part on the inter-channel delay d(f), an elevation angle phi(f) may be estimated in block 1250 according to the following equation:

$$phi(f)=a\ sin(d(f)/(\mathrm{maxDelay}/c*\mathrm{srate}))\quad\quad\text{(Equation 2)}$$

In Equation 2, "maxDelay" represents the maximum realizable delay, which may correspond to the vertical offset between the longitudinal axes of the left and right microphones divided by the speed of sound c. In Equation 2, "srate" represents a sample rate. According to some examples, block 1250 may involve smoothing the estimated elevation angle from frame to frame of the audio data, e.g., by using a leaky integrator equation or another such smoothing function.

As noted above, in the example shown in FIG. 12 the output from block 1215 is provided to block 1225. According to this implementation, block 1225 involves determining an inter-channel level difference. In this implementation, block 1225 involves determining a level difference for each of a plurality of sub-bands. According to some examples, block 1225 involves determining a level difference between the frequency-domain signals L(f) and R(f), which correspond to left and right microphone audio signals, for each subband f.

In the example shown in FIG. 12, block 1245 involves estimating an azimuthal angle corresponding to a sound source location. According to this implementation, block 1245 involves estimating an azimuthal angle based on the level difference determined in block 1225 for each subband f. Many XY microphone systems include microphone capsules that have a cardioid polar pattern, e.g., as shown in FIG. 7. The longitudinal axes of the microphone capsules are typically separated by a 90 degree angle or a 120 degree angle in the azimuthal plane, which is shown as angle a in FIG. 7. Accordingly, in some implementations, block 1225 may involve an underlying assumption that the gains for the left and right channels correspond with a cardioid directivity function of the form:

$$M(f)=a(f)+(1-a(f))\cos(\mathrm{theta}+/-\alpha/2\text{ degrees})\quad\quad\text{(Equation 3)}$$

In Equation 3, M(f) corresponds with a microphone directivity function of frequency f and a(f) corresponds with a variable that represents the shape of the cardioid as a function of frequency: the length of any chord through the cusp point of a cardioid is 2a. a(f) is typically less than 0.5. Based on Equation 3 and the inter-channel level difference between L(f) and R(f) that is determined in block 1225, a corresponding azimuthal angle θ can be determined.

A more accurate estimation of azimuthal angle may be made if information is known regarding the actual directivity response of the microphone capsules from which the audio data is received in block 1205. Accordingly, in some implementations, information regarding the actual directivity response of the microphone capsules may be received, along with the audio data, in block 1205. Such information regarding the actual directivity response of the microphone capsules may indicate the actual angular separation a of the longitudinal axes of the microphone capsules, the actual polar patterns of the microphone capsules, etc.

In addition, a more accurate estimation of azimuthal angle may be made if the estimated elevation angle phi(f) is taken into account when estimating the azimuth angle. Accordingly, in some implementations block 1245 may involve estimating an azimuthal angle based on the inter-channel level differences determined in block 1225 and the elevation angle phi(f) that is determined in block 1250. For example, the elevation angle can be obtained from lookup tables mapping the L/R energy ratio to an azimuth angle according to Eq. 3. These lookup tables can be extended to 3D by replacing the cos term in Equation 3 by the dot product between possible 3D directions of the source and the main direction of each microphones (for example, vectors X and Y, extending along the x and y axes of FIG. 7) M=a+(1−a) p.X or p.Y for the left and right channels respectively. By pre-computing different azimuth lookup tables for different elevation values, one can select the correct lookup table for the azimuth, once the elevation angle phi is known.

It is worth noting that the mapping from inter-channel level differences to azimuthal angle is "front/back" ambiguous, because there are generally 2 azimuthal angles that lead to the same inter-channel level differences. This can be seen in FIG. 11 wherein the dashed line, which corresponds with a L/R energy ratio of approximately −10 dB, intersects the curve 1105 in two places and also intersects the curve 1110 in two places. These intersection points indicate 2 possible azimuth readings for each curve that correspond with a single L/R energy ratio. This ambiguity may be addressed in various ways.

According to some implementations, the estimation of azimuthal angle may be biased towards the front of the microphones. Such a biasing process may cause a folding of sound source locations that are actually located directly behind the microphone to the front center. However, this may not be a significant problem in practice because XY microphones are naturally biased to capture the frontal areas with a higher sensitivity.

According to some alternative implementations, a probability may be estimated (e.g., in the range [0,1]) of having the sound source location in the front-biased azimuth position or the back-biased azimuth position by evaluating the expected "spectral tilt" of the inter-channel level difference across multiple subbands. From this estimation, 2 audio objects can be used to render each subband (one at each of the two possible azimuths). The two audio objects may, for example, use the same mono signal, as noted below, with a gain that is proportional to the probability estimator. For instance, if the probability of being in front is 1, then the back-biased object would receive a gain of 0 and vice versa.

According to some implementations, the front/back ambiguity may be resolved by reference to a third microphone. For example, some implementations may include an additional back-facing directional microphone. Referring to FIG. 7, in some such examples, a longitudinal axis of the third microphone may be along the axis 702, with the third microphone facing towards the area labeled "BACK." The front/back ambiguity may easily be resolved by reference to a third directional microphone having such an orientation, because signals from sound sources located behind the microphone system (such as the sound source 715*b*) will be detected at a significantly higher level than signals from sound sources located in front of the microphone system (such as the sound source 715*a*).

In some examples, the azimuth angles that are estimated in block 1245 may be smoothed from audio frame to audio frame, e.g., by using a leaky integrator function or another smoothing function.

In the implementation shown in FIG. 12, block 1235 involves an optional delay correction process. In this example, block 1235 is based, at least in part, on the inter-channel delay differences that are estimated in block 1230. These inter-channel delay differences may be used to improve the time alignment of the L and R signals and may, for example, be used to improve the direct/diffuse separation process of block 1240. Block 1235 may, for example, involve adding a phase-shift to each frequency bin in frequency domain proportional to the frequency and delay to be corrected. For example, block 1235 may involve multiplying FFT complex coefficients by exp (+/−i*omega*d(f)/2), where omega is the angular frequency at each FFT bin.

In the example shown in FIG. 12, block 1240 involves separating direct and diffuse components of audio signals. Many existing upmixers assume L(f) and R(f) to be a mixture of a main correlated source signal and a background decorrelated component. According to some implementations disclosed herein, this model may be extended to account for the relative propagation delay d(f), e.g., according to the following expressions:

$$L(f)=Dir_L(f)+Diff_L(f)=M_L(f)S(f)+Diff_L(f) \quad \text{(Equation 4)}$$

$$R(f)=Dir_R(f)+Diff_R(f)=M_R(f)S(f-d(f))+Diff_R(f) \quad \text{(Equation 5)}$$

In Equations 4 and 5, $Dir_L$ (f) and $Dir_R$ (f) represent the direct components of the left and right microphone audio signals, respectively. $Diff_L$ (f) and $Diff_R$ (f) represent decorrelated diffuse residual components of the left and right microphone audio signals, respectively. $M_L(f)$ and $M_R(f)$ represent directivity functions of the left and right microphone capsules and S represents a main correlated source of sound. According to some implementations, the foregoing direct and diffuse components may be used as the audio signals, also referred to herein as the "audio essence," for each sub-band audio object.

In this implementation, block 1270 involves associating size and position metadata with diffuse residual audio objects. According to some implementations, from the two diffuse residual components $Diff_L$ (f) and $Diff_R$ (f) that are generated in block 1240, two audio objects may be created in block 1270. Although it would be possible to estimate location information (such as azimuthal angle information) for a diffuse component, in theory diffuse components are decorrelated. Accordingly, in some implementations block 1270 involves determining two audio objects with fixed positions (for example, on the middle side wall on the left and right side of a virtual playback environment, such as the virtual playback environment 404 shown in FIG. 4A) and a large size so as to cover about half of the virtual playback environment on each side. Most object renderers render an audio object with large size metadata using decorrelation. However, in some implementations, an additional explicit decorrelation indication, such as an explicit decorrelation flag, may also be generated in block 1270. In some implementations, each audio object may receive $Dir_L(f)$ and $Dir_R(f)$ as their audio essence signal.

According to some implementations, the direct, correlated components of L(f) and R(f) may be interpreted as a single direct audio object, the position of which is determined by the azimuth angle estimated in block 1245 and the elevation angle estimated in block 1250. In the example shown in FIG. 12, block 1255 involves performing a direction-dependent level correction and a mono downmix for the direct components of L(f) and R(f). For example, block 1255 may involve determining the audio essence S(F) for each direct audio object from the direct signals $Dir_L(f)$ and $Dir_R(f)$ after the direct/diffuse separation of block 1240 by solving for S(f), e.g., according to Equation 6:

$$\frac{(1/M_L(f)Dir_L(f)+1/M_R(f)Dir_R(f))}{2} \quad \text{(Equation 6)}$$

According to this example, method 1200 involves estimating an audio object size parameter, which may also be referred to herein as a "width" parameter. Depending on the particular implementation, estimating the object size parameter of the sound source may involve determining a variance of azimuthal angles corresponding to the sound source, determining a variance of elevation angles corresponding to the sound source, or determining variances of both azimuthal angles and elevation angles corresponding to the sound source. Some implementations may involve determining an object size parameter for each sub-band.

In this example, block 1265 involves estimating an audio object size parameter according to the variance of azimuthal angle estimates determined in block 1245 and the variance of elevation angle estimates determined in block 1250. In some examples, block 1265 may involve estimating audio object size parameter according to an average of the angular variance, according to the maximum of the angular variance, or according to some other metric. In one example, block 1265 involves estimating audio object size W(f) in a range of [0,1] according to the following expression:

$$W(f)=0.5*(\text{Var}(|phi(f)|)/(\pi/2)+\text{Var}(|azim(f)|)/\pi) \quad \text{(Equation 7)}$$

In Equation 7, "Var" represents variance, elevation angles are assumed to be in the range of [−π/2, π/2] and azimuth angles are assumed to be in the range of [−π,π].

FIG. 12 also includes an optional attitude correction process in block 1260. In some examples, the azimuthal angle and the elevation angle may be determined relative to a first coordinate system. The first coordinate system may be a coordinate system that corresponds with a microphone system. As noted above, the azimuthal angle and the elevation angle are examples of what may be referred to herein as "audio object location data." According to some examples, block 1260 may involve transforming the audio object location data into coordinates of a second coordinate system. In some implementations, block 1260 may involve receiving inertial sensor data and transforming the audio object location data into coordinates of the second coordinate system based, at least in part, on the inertial sensor data.

According to some such examples, the microphone system that is used for recording the original L and R signals may be is mounted on a device that is capable of providing inertial sensor data. For example, the microphone system may be like the microphone system 500a that is shown in FIG. 5, and may be configured for coupling with a second device, such as a smart phone. The second device may be capable of attitude sensing and may, for example, include one or more accelerometers, gyroscopes, etc., such as are commonly available on mobile phones or tablets. In some implementations, the second device may include a magnetometer. When using such a configuration, it is possible to record inertial sensor data provided by the second device along with the audio data from the microphone system.

It is therefore possible to compensate for the motion of the recording device. In some implementations such compensation, also referred to herein as attitude correction, may be made prior to outputting the audio object location data for each audio object. According to some examples, the attitude correction process of block 1260 may be used to compensate for accidental movement, such as jitter, of the microphone during the recording process. In some implementations, the attitude correction process of block 1260 may be used to make the stereo recording seem as if the second device (and the attached microphone system) had not moved during the time the recording was made. In some examples, block 1260 may involve attitude correction according to a reference orientation, which is an example of the second coordinate system that is referenced above. In one example, the original smart phone orientation, at the time that a recording process began, could be used as a reference orientation. In another example, which might be particularly useful for implementations wherein the second device includes a magnetometer, a compass orientation (e.g., facing north) could be used as a reference orientation.

In some instances, a user may "track" a moving object, such as a car or an airplane, by keeping the microphone facing the moving object. This may be desirable if the microphones of the microphone system are directional, because the sound quality will be better if the user keeps the moving object in front of the directional microphones. According to some such implementations, block 1260 may involve using inertial sensor data captured during the recording process to reconstruct the object's motion and make the recording appear to have been made by a stationary microphone system that corresponds with a reference orientation.

In the example shown in FIG. 12, block 1275 involves associating size and position metadata with the mono downmix for direct audio objects that is output from the process of block 1255. According to this example, the size metadata used in the process of block 1275 are output from the process of block 1265. Here, the position metadata used in the process of block 1275 (also referred to herein as "audio object location data") are output from the process of the optional attitude correction block 1260. However, in alternative implementations, the audio object location data output by the processes of blocks 1245 and 1250 may be input to the process of block 1275.

As noted above, some disclosed implementations involve performing an audio object clustering process on N audio objects that outputs fewer than N audio objects. Accordingly, the method 1200 includes an optional clustering block 1280. In this example, the outputs of block 1270 and block 1275 are received as input to the process of block 1280. Implementations that involve an upsampling process also may involve a subsequent downsampling operation. The downsampling operation may, for example, occur after block 1270 and block 1275 but before block 1280. Alternatively, block 1270 and block 1275 may include a downsampling operation. According to some such examples, for each of the k frequency sub-bands, k direct audio objects and 2 k diffuse audio objects are obtained. In order to reduce the size of the obtained audio object representation, as well as further reduce noise in the positional estimation, some implementations involve clustering the sets of audio objects that are output by blocks 1270 and 1275 to a smaller set of output audio objects 1285. Some examples of clustering are provided below.

Scene Simplification Through Object Clustering

Some implementations may involve a clustering process that combines objects that are similar in some respect, for example in terms of spatial location, spatial size, or content type. For purposes of the following description, the terms "clustering" and "grouping" or "combining" are used interchangeably to describe the combination of objects and/or beds (channels) to reduce the amount of data in a unit of adaptive audio content for transmission and rendering in an adaptive audio playback system; and the term "reduction" may be used to refer to the act of performing scene simplification of adaptive audio through such clustering of objects and beds. The terms "clustering," "grouping" or "combining" throughout this description are not limited to a strictly unique assignment of an object or bed channel to a single cluster only, instead, an object or bed channel may be distributed over more than one output bed or cluster using weights or gain vectors that determine the relative contribution of an object or bed signal to the output cluster or output bed signal.

In an embodiment, an adaptive audio system includes at least one component configured to reduce bandwidth of object-based audio content through object clustering and perceptually transparent simplifications of the spatial scenes created by the combination of channel beds and objects. An object clustering process executed by the component(s) uses certain information about the objects that may include spatial position, object content type, temporal attributes, object size and/or the like, to reduce the complexity of the spatial scene by grouping like objects into object clusters that replace the original objects.

The additional audio processing for standard audio coding to distribute and render a compelling user experience based on the original complex bed and audio tracks is generally referred to as scene simplification and/or object clustering. The main purpose of this processing is to reduce the spatial scene through clustering or grouping techniques that reduce the number of individual audio elements (beds and objects) to be delivered to the reproduction device, but that still retain enough spatial information so that the perceived difference between the originally authored content and the rendered output is minimized.

The scene simplification process can facilitate the rendering of object-plus-bed content in reduced bandwidth channels or coding systems using information about the objects such as spatial position, temporal attributes, content type, size and/or other appropriate characteristics to dynamically cluster objects to a reduced number. This process can reduce the number of objects by performing one or more of the following clustering operations: (1) clustering objects to objects; (2) clustering object with beds; and (3) clustering objects and/or beds to objects. In addition, an object can be distributed over two or more clusters. The process may use temporal information about objects to control clustering and de-clustering of objects.

In some implementations, object clusters replace the individual waveforms and metadata elements of constituent objects with a single equivalent waveform and metadata set, so that data for N objects is replaced with data for a single object, thus essentially compressing object data from N to 1. Alternatively, or additionally, an object or bed channel may be distributed over more than one cluster (for example, using amplitude panning techniques), reducing object data from N to M, with M<N. The clustering process may use an error metric based on distortion due to a change in location, loudness or other characteristic of the clustered objects to determine a tradeoff between clustering compression versus sound degradation of the clustered objects. In some embodiments, the clustering process can be performed synchronously. Alternatively, or additionally, the clustering process may be event-driven, such as by using auditory scene analysis (ASA) and/or event boundary detection to control object simplification through clustering.

In some embodiments, the process may utilize knowledge of endpoint rendering algorithms and/or devices to control clustering. In this way, certain characteristics or properties of the playback device may be used to inform the clustering process. For example, different clustering schemes may be utilized for speakers versus headphones or other audio drivers, or different clustering schemes may be used for lossless versus lossy coding, and so on.

Figure 13:
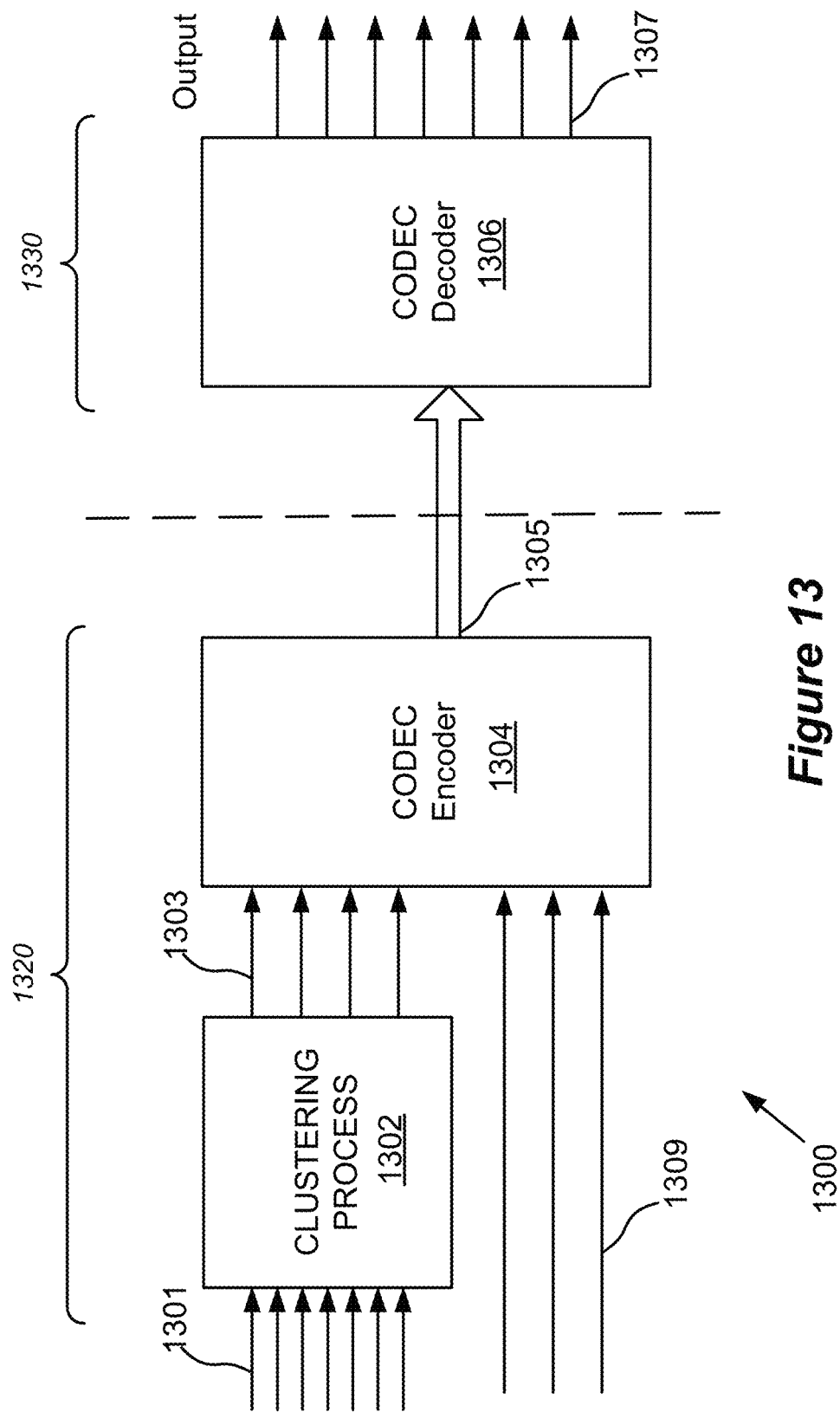
FIG. 13 is a block diagram that shows an example of a system capable of executing a clustering process.

FIG. 13 is a block diagram that shows an example of a system capable of executing a clustering process. As shown in FIG. 13, system 1300 includes encoder 1304 and decoder 1306 stages that process input audio signals to produce output audio signals at a reduced bandwidth. In some implementations, the portion 1320 and the portion 1330 may be in different locations. For example, the portion 1320 may correspond to a post-production authoring system and the portion 1330 may correspond to a playback environment, such as a home theater system. In the example shown in FIG. 13, a portion 1309 of the input signals is processed through known compression techniques to produce a compressed audio bitstream 1305. The compressed audio bitstream 1305 may be decoded by decoder stage 1306 to produce at least a portion of output 1307. Such known compression techniques may involve analyzing the input audio content 1309, quantizing the audio data and then performing compression techniques, such as masking, etc., on the audio data itself. The compression techniques may be lossy or lossless and may be implemented in systems that may allow the user to select a compressed bandwidth, such as 192 kbps, 256 kbps, 512 kbps, etc.

In an adaptive audio system, at least a portion of the input audio comprises input signals 1301 that include audio objects, which in turn include audio object signals and associated metadata. The metadata defines certain characteristics of the associated audio content, such as object spatial position, object size, content type, loudness, and so on. Any practical number of audio objects (e.g., hundreds of objects) may be processed through the system for playback. To facilitate accurate playback of a multitude of objects in a wide variety of playback systems and transmission media, system 1300 includes a clustering process or component 1302 that reduces the number of objects into a smaller, more manageable number of objects by combining the original objects into a smaller number of object groups.

The clustering process thus builds groups of objects to produce a smaller number of output groups 1303 from an original set of individual input objects 1301. The clustering process 1302 essentially processes the metadata of the objects as well as the audio data itself to produce the reduced number of object groups. The metadata may be analyzed to determine which objects at any point in time are most appropriately combined with other objects, and the corresponding audio waveforms for the combined objects may be summed together to produce a substitute or combined object. In this example, the combined object groups are then input to the encoder 1304, which is configured to generate a bitstream 1305 containing the audio and metadata for transmission to the decoder 1306.

In general, the adaptive audio system incorporating the object clustering process 1302 includes components that generate metadata from the original spatial audio format. The system 1300 comprises part of an audio processing system configured to process one or more bitstreams containing both conventional channel-based audio elements and audio object coding elements. An extension layer containing the audio object coding elements may be added to the channel-based audio codec bitstream or to the audio object bitstream. Accordingly, in this example the bitstreams 1305 include an extension layer to be processed by renderers for use with existing speaker and driver designs or next generation speakers utilizing individually addressable drivers and driver definitions.

The spatial audio content from the spatial audio processor may include audio objects, channels, and position metadata. When an object is rendered, it may be assigned to one or more speakers according to the position metadata and the location of the playback speakers. Additional metadata, such as size metadata, may be associated with the object to alter the playback location or otherwise limit the speakers that are to be used for playback. Metadata may be generated in the audio workstation in response to the engineer's mixing inputs to provide rendering cues that control spatial parameters (e.g., position, size, velocity, intensity, timbre, etc.) and specify which driver(s) or speaker(s) in the listening environment play respective sounds during exhibition. The metadata may be associated with the respective audio data in the workstation for packaging and transport by spatial audio processor.

Figure 14:
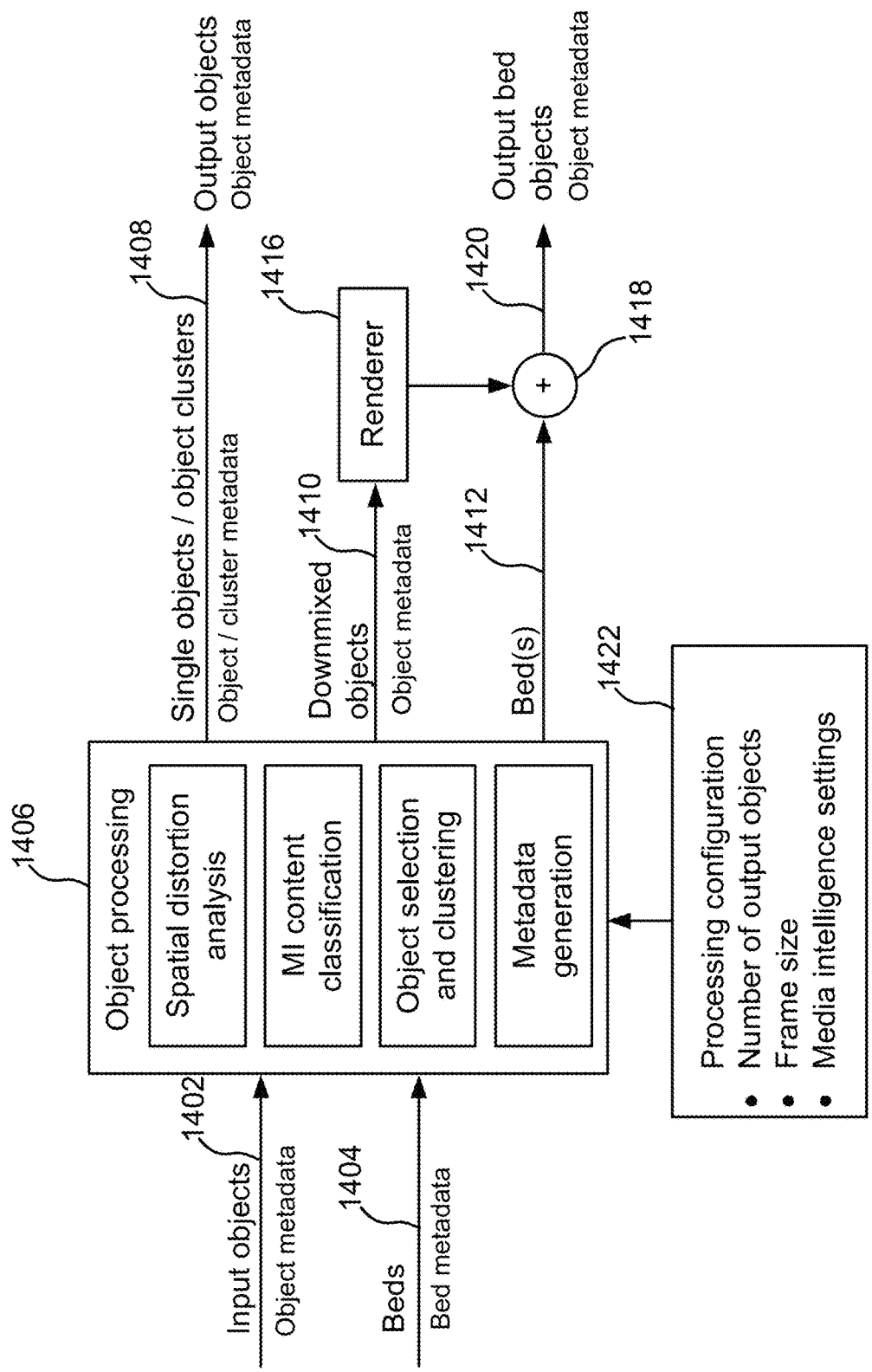
FIG. 14 is a block diagram that illustrates an example of a system capable of clustering objects and/or beds in an adaptive audio processing system.

FIG. 14 is a block diagram that illustrates an example of a system capable of clustering objects and/or beds in an adaptive audio processing system. In the example shown in FIG. 14, an object processing component 1406, which is capable of performing scene simplification tasks, reads in an arbitrary number of input audio files and metadata. The input audio files comprise input objects 1402 and associated object metadata, and may include beds 1404 and associated bed metadata. This input file/metadata thus correspond to either "bed" or "object" tracks.

In this example, the object processing component 1406 is capable of combining media intelligence/content classification, spatial distortion analysis and object selection/clustering information to create a smaller number of output objects and bed tracks. In particular, objects can be clustered together to create new equivalent objects or object clusters 1408, with associated object/cluster metadata. The objects can also be selected for downmixing into beds. This is shown in FIG. 14 as the output of downmixed objects 1410 input to a renderer 1416 for combination 1418 with beds 1412 to form output bed objects and associated metadata 1420. The output bed configuration 1420 (e.g., a Dolby 5.1 configuration) does not necessarily need to match the input bed configuration, which for example could be 9.1 for Atmos cinema. In this example, new metadata are generated for the output tracks by combining metadata from the input tracks and new audio data are also generated for the output tracks by combining audio from the input tracks.

In this implementation, the object processing component 1406 is capable of using certain processing configuration information 1422. Such processing configuration information 1422 may include the number of output objects, the frame size and certain media intelligence settings. Media intelligence can involve determining parameters or characteristics of (or associated with) the objects, such as content type (i.e., dialog/music/effects/etc.), regions (segment/classification), preprocessing results, auditory scene analysis results, and other similar information. For example, the object processing component 1406 may be capable of determining which audio signals correspond to speech, music and/or special effects sounds. In some implementations, the object processing component 1406 is capable of determining at least some such characteristics by analyzing audio signals. Alternatively, or additionally, the object processing component 1406 may be capable of determining at least some such characteristics according to associated metadata, such as tags, labels, etc.

In an alternative embodiment, audio generation could be deferred by keeping a reference to all original tracks as well as simplification metadata (e.g., which objects belongs to which cluster, which objects are to be rendered to beds, etc.). Such information may, for example, be useful for distributing functions of a scene simplification process between a studio and an encoding house, or other similar scenarios.

Various modifications to the implementations described in this disclosure may be readily apparent to those having ordinary skill in the art. The general principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Various features and aspects will be appreciated from the following enumerated example embodiments ("EEEs"):

EEE 1. A method, comprising:
receiving input audio data including first microphone audio signals and second microphone audio signals output by a pair of coincident, vertically-stacked directional microphones;
determining, based at least in part on an intensity difference between the first microphone audio signals and the second microphone audio signals, an azimuthal angle corresponding to a sound source location;
determining, based at least in part on a temporal difference between the first microphone audio signals and the second microphone audio signals, an elevation angle corresponding to the sound source location; and
generating output audio data including at least one audio object corresponding to a sound source, the audio object comprising audio object signals and associated audio object metadata, the audio object metadata including at least audio object location data corresponding to the sound source location.

EEE 2. The method of EEE 1, further comprising upsampling the input audio data.

EEE 3. The method of EEE 2, wherein the upsampling is performed prior to determining the elevation angle.

EEE 4. The method of any one of EEEs 1-3, further comprising splitting the input audio data into sub-bands.

EEE 5. The method of EEE 4, wherein the generating involves generating a plurality of audio objects, each audio object of the plurality of audio objects corresponding to a sub-band.

EEE 6. The method of EEE 5, wherein the generating involves generating N audio objects, further comprising performing an audio object clustering process on the N audio objects that outputs fewer than N audio objects.

EEE 7. The method of any one of EEEs 1-6, wherein the audio object location data is based, at least in part, on the azimuthal angle and the elevation angle.

EEE 8. The method of any one of EEEs 1-7, wherein the azimuthal angle and the elevation angle are determined relative to a first coordinate system, further comprising transforming the audio object location data into coordinates of a second coordinate system.

EEE 9. The method of EEE 8, further comprising receiving inertial sensor data, wherein transforming the audio object location data into the second coordinate system is based, at least in part, on the inertial sensor data.

EEE 10. The method of any one of EEEs 1-9, further comprising determining an object size parameter of the sound source.

EEE 11. The method of EEE 10, wherein determining the object size parameter of the sound source involves determining a variance of azimuthal angles corresponding to the sound source, determining a variance of elevation angles corresponding to the sound source, or determining variances of both azimuthal angles and elevation angles corresponding to the sound source.

EEE 12. The method of EEE 11, wherein the method involves splitting the input audio data into sub-bands and determining an object size parameter for each of the sub-bands.

EEE 13. The method of EEE 10, further comprising determining a diffuse residual that corresponds to uncorrelated components of the first microphone audio signals and the second microphone audio signals and representing the diffuse residual as a pair of additional audio objects having a large size and large decorrelation parameters.

EEE 14. The method of any one of EEEs 1-13, wherein the pair of coincident, vertically-stacked directional microphones comprises a XY stereo microphone system.

EEE 15. The method of any one of EEEs 1-14, wherein the elevation angle corresponding to the sound source location is determined based upon a vertical distance between a first microphone and a second microphone of the pair of coincident, vertically-stacked directional microphones.

EEE 16. The method of any one of EEEs 1-15, further comprising:
determining a cross-correlation function between the first microphone audio signals and the second microphone audio signals; and
upsampling the cross-correlation function.

EEE 17. An apparatus, comprising:
an interface system; and
a control system capable of:
receiving, via the interface system, input audio data including first microphone audio signals and second microphone audio signals output by a pair of coincident, vertically-stacked directional microphones;
determining, based at least in part on an intensity difference between the first microphone audio signals and the second microphone audio signals, an azimuthal angle corresponding to a sound source location;
determining, based at least in part on a temporal difference between the first microphone audio signals and the second microphone audio signals, an elevation angle corresponding to the sound source location; and
generating output audio data including at least one audio object corresponding to a sound source, the audio object comprising audio object signals and associated audio object metadata, the audio object metadata including at least audio object location data corresponding to the sound source location.

EEE 18. The apparatus of EEE 17, wherein the control system includes at least one of a processor, such as a general purpose single- or multi-chip processor, a digital signal processor (DSP), an application specific integrated circuit (ASIC), a field programmable gate array (FPGA) or other programmable logic device, discrete gate or transistor logic, discrete hardware components, or combinations thereof.

EEE 19. The apparatus of EEE 17 or EEE 18, wherein the interface system includes at least one of a user interface or a network interface.

EEE 20. The apparatus of any one of EEEs 17-19, further comprising a memory system, wherein the interface system includes at least one interface between the control system and the memory system.

EEE 21. The apparatus of any one of EEEs 17-20, wherein the control system is capable of splitting the input audio data into sub-bands and wherein the generating involves generating a plurality of audio objects, each audio object of the plurality of audio objects corresponding to a sub-band.

EEE 22. The apparatus of any one of EEEs 17-21, wherein the azimuthal angle and the elevation angle are determined relative to a first coordinate system, wherein the control system is capable of:

receiving, via the interface system, inertial sensor data; and transforming the audio object location data into coordinates of a second coordinate system based, at least in part, on the inertial sensor data.

EEE 23. The apparatus of any one of EEEs 17-22, wherein the control system is capable of determining an object size parameter of the sound source.

EEE 24. A non-transitory medium having software stored thereon, the software including instructions for controlling at least one apparatus for:

receiving input audio data including first microphone audio signals and second microphone audio signals output by a pair of coincident, vertically-stacked directional microphones;

determining, based at least in part on an intensity difference between the first microphone audio signals and the second microphone audio signals, an azimuthal angle corresponding to a sound source location;

determining, based at least in part on a temporal difference between the first microphone audio signals and the second microphone audio signals, an elevation angle corresponding to the sound source location; and generating output audio data including at least one audio object corresponding to a sound source, the audio object comprising audio object signals and associated audio object metadata, the audio object metadata including at least audio object location data corresponding to the sound source location.

EEE 25. The non-transitory medium of EEE 24, wherein the software includes instructions for splitting the input audio data into sub-bands and wherein the generating involves generating a plurality of audio objects, each audio object of the plurality of audio objects corresponding to a sub-band.

EEE 26. The non-transitory medium of EEE 24 or EEE 25, wherein the azimuthal angle and the elevation angle are determined relative to a first coordinate system, wherein the software includes instructions for:

receiving inertial sensor data; and transforming the audio object location data into coordinates of a second coordinate system based, at least in part, on the inertial sensor data.

EEE 27. The non-transitory medium of any one of EEEs 24-26, wherein the software includes instructions for determining an object size parameter of the sound source.

The invention claimed is:

1. A system comprising:
one or more computer processors; and
a non-transitory computer-readable medium storing instructions that, upon execution by the one or more processors, cause the one or more computer processors to perform operations comprising:

receiving input audio data including first microphone audio signals and second microphone audio signals output by a pair of coincident, vertically-stacked directional microphones;

determining, based at least in part on an intensity difference between the first microphone audio signals and the second microphone audio signals, an azimuthal angle corresponding to a sound source location;

determining, based at least in part on a temporal difference between the first microphone audio signals and the second microphone audio signals, an elevation angle corresponding to the sound source location;

determining a diffuse residual that corresponds to uncorrelated components of the first microphone audio signals and the second microphone audio signals;

generating output audio data including at least one audio object corresponding to a sound source, the audio object comprising audio object signals and associated audio object metadata, the audio object metadata including at least audio object location data corresponding to the sound source location; and representing the diffuse residual as a pair of additional audio objects having a large size and large decorrelation parameters.

2. The system of claim 1, the operations further comprising upsampling the input audio data.

3. The system of claim 2, wherein the upsampling is performed prior to determining the elevation angle.

4. The system of claim 1, the operations further comprising splitting the input audio data into sub-bands.

5. The system of claim 4, wherein the generating involves generating a plurality of audio objects, each audio object of the plurality of audio objects corresponding to a sub-band.

6. The system of claim 5, wherein generating the plurality of audio objects includes generating N audio objects, further comprising performing an audio object clustering process on the N audio objects that outputs fewer than N audio objects.

7. The system of claim 1, wherein the audio object location data is based, at least in part, on the azimuthal angle and the elevation angle.

8. The system of claim 1, wherein the azimuthal angle and the elevation angle are determined relative to a first coordinate system, further comprising transforming the audio object location data into coordinates of a second coordinate system.

9. The system of claim 8, the operations further comprising receiving inertial sensor data, wherein transforming the audio object location data into the second coordinate system is based, at least in part, on the inertial sensor data.

10. The system of claim 1, wherein the pair of coincident, vertically-stacked directional microphones comprises a XY stereo microphone system.

11. The system of claim 10, wherein the method involves splitting the input audio data into sub-bands and determining an object size parameter for each of the sub-bands.

12. The system of claim 1, wherein the elevation angle corresponding to the sound source location is determined based upon a vertical distance between a first microphone and a second microphone of the pair of coincident, vertically-stacked directional microphones.

13. The system of claim 1, the operations further comprising:
- determining a cross-correlation function between the first microphone audio signals and the second microphone audio signals; and
- upsampling the cross-correlation function.

14. A non-transitory computer-readable medium storing instructions that, upon execution by one or more processors, cause the one or more computer processors to perform operations comprising:
- receiving input audio data including first microphone audio signals and second microphone audio signals output by a pair of coincident, vertically-stacked directional microphones;
- determining, based at least in part on an intensity difference between the first microphone audio signals and the second microphone audio signals, an azimuthal angle corresponding to a sound source location;
- determining, based at least in part on a temporal difference between the first microphone audio signals and the second microphone audio signals, an elevation angle corresponding to the sound source location;
- determining a diffuse residual that corresponds to uncorrelated components of the first microphone audio signals and the second microphone audio signals;
- generating output audio data including at least one audio object corresponding to a sound source, the audio object comprising audio object signals and associated audio object metadata, the audio object metadata including at least audio object location data corresponding to the sound source location; and
- representing the diffuse residual as a pair of additional audio objects having a large size and large decorrelation parameters.

15. The non-transitory computer-readable medium of claim 14, the operations further comprising upsampling the input audio data.

16. The non-transitory computer-readable medium of claim 15, wherein the upsampling is performed prior to determining the elevation angle.

17. The non-transitory computer-readable medium of claim 14, the operations further comprising splitting the input audio data into sub-bands.

18. The non-transitory computer-readable medium of claim 17, wherein the generating involves generating a plurality of audio objects, each audio object of the plurality of audio objects corresponding to a sub-band.

19. The non-transitory computer-readable medium of claim 18, wherein generating the plurality of audio objects includes generating N audio objects, further comprising performing an audio object clustering process on the N audio objects that outputs fewer than N audio objects.

20. The non-transitory computer-readable medium of claim 14, wherein the audio object location data is based, at least in part, on the azimuthal angle and the elevation angle.

\* \* \* \* \*